US011921924B2

(12) United States Patent
Mani et al.

(10) Patent No.: US 11,921,924 B2
(45) Date of Patent: *Mar. 5, 2024

(54) ASSISTIVE DEVICE FOR NON-VISUALLY DISCERNING A THREE-DIMENSIONAL (3D) REAL-WORLD AREA SURROUNDING A USER

(71) Applicants: Alex Hamid Mani, LaJolla, CA (US); Ahmadreza Rofougaran, Newport Beach, CA (US)

(72) Inventors: Alex Hamid Mani, LaJolla, CA (US); Ahmadreza Rofougaran, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/037,408

(22) Filed: Sep. 29, 2020

(65) Prior Publication Data

US 2021/0026452 A1  Jan. 28, 2021

Related U.S. Application Data

(63) Continuation of application No. 16/526,061, filed on Jul. 30, 2019, now Pat. No. 10,831,311, which is a
(Continued)

(51) Int. Cl.
*G06F 3/01* (2006.01)
*G06F 3/0346* (2013.01)
(Continued)

(52) U.S. Cl.
CPC ............. *G06F 3/016* (2013.01); *G06F 3/011* (2013.01); *G06F 3/017* (2013.01); *G06F 3/0346* (2013.01); *G06F 3/0416* (2013.01); *G08B 6/00* (2013.01)

(58) Field of Classification Search
None
See application file for complete search history.

(56) References Cited

U.S. PATENT DOCUMENTS 6,650,338 B1    11/2003  Kolarov et al.
7,855,657 B2 *  12/2010  Doemens ............... A61H 3/061
                                                340/686.6
(Continued)

FOREIGN PATENT DOCUMENTS

JP      2010528716 A    8/2010
KR      101885779 B1    8/2018

OTHER PUBLICATIONS

Corrected Notice of Allowance for U.S. Appl. No. 16/526,061 dated Oct. 6, 2020.
(Continued)

*Primary Examiner* — Benjamin X Casarez
(74) *Attorney, Agent, or Firm* — CHIP LAW GROUP

(57) ABSTRACT

An assistive device and method for non-visually discerning a three-dimensional (3D) real-world area surrounding a user, comprises a haptic feedback interface that includes a plurality of haptic elements. The assistive device receives sensor data of the 3D real-world area within a first proximity range of the assistive device from a plurality of different types of sensors that are communicatively coupled to the assistive device. The assistive device establishes a mapping of a plurality of objects within the first proximity range to the plurality of haptic elements in a defined region of the haptic feedback interface, based on the received sensor data. A haptic feedback generator generates a touch-discernible feedback on the haptic feedback interface based on the established mapping. The touch-discernible feedback comprises a plurality of differential touch-discernible cues to enable the user to non-visually discern the 3D real-world area surrounding the user.

21 Claims, 8 Drawing Sheets

Related U.S. Application Data continuation of application No. 15/709,793, filed on Sep. 20, 2017, now Pat. No. 10,503,310.

(51) Int. Cl.
*G06F 3/041* (2006.01)
*G08B 6/00* (2006.01)

(56) References Cited

U.S. PATENT DOCUMENTS

| | | | |
|---|---|---|---|
| 8,410,916 | B1* | 4/2013 | Camoriano Gladson ............... G06F 3/016 340/407.1 |
| 8,754,757 | B1 | 6/2014 | Ullrich et al. |
| 9,147,328 | B2 | 9/2015 | Ioffreda et al. |
| 9,417,754 | B2 | 8/2016 | Smith |
| 9,635,440 | B2 | 4/2017 | Lacroix |
| 9,792,501 | B1 | 10/2017 | Maheriya et al. |
| 9,919,208 | B2 | 3/2018 | Rihn et al. |
| 9,928,701 | B2 | 3/2018 | Levesque et al. |
| 9,946,346 | B2 | 4/2018 | Kawamura et al. |
| 10,281,983 | B2 | 5/2019 | Mani |
| 10,496,176 | B2 | 12/2019 | Mani |
| 10,503,310 | B2 | 12/2019 | Mani et al. |
| 10,754,429 | B2 | 8/2020 | Mani |
| 10,831,311 | B2* | 11/2020 | Mani ............... G06F 3/0346 |
| 11,175,740 | B2 | 11/2021 | Mani |
| 11,331,938 | B1 | 5/2022 | Kaplan et al. |
| 11,455,041 | B2 | 9/2022 | Mani |
| 11,561,619 | B2 | 1/2023 | Mani et al. |
| 2002/0084996 | A1 | 7/2002 | Temkin et al. |
| 2006/0038781 | A1 | 2/2006 | Levin |
| 2012/0169620 | A1* | 7/2012 | Bowler, II ............... G06F 3/016 345/173 |
| 2012/0194420 | A1 | 8/2012 | Osterhout et al. |
| 2013/0038756 | A1* | 2/2013 | Cheng ............... H04N 21/4788 348/E5.031 |
| 2013/0038792 | A1 | 2/2013 | Quigley et al. |
| 2014/0267904 | A1 | 9/2014 | Saboune et al. |
| 2015/0253851 | A1* | 9/2015 | Oh ............... G06F 3/04883 345/179 |
| 2015/0302772 | A1 | 10/2015 | Yu et al. |
| 2016/0018920 | A1* | 1/2016 | Deokar ............... G06F 3/016 345/174 |
| 2016/0184703 | A1* | 6/2016 | Brav ............... A63F 13/213 463/30 |
| 2016/0378214 | A1* | 12/2016 | Chi ............... H04B 1/3827 345/173 |
| 2017/0024010 | A1* | 1/2017 | Weinraub ............... G01C 21/20 |
| 2017/0177085 | A1 | 6/2017 | Sun et al. |
| 2017/0236330 | A1* | 8/2017 | Seif ............... G06F 3/147 345/633 |
| 2018/0112978 | A1 | 4/2018 | Burton et al. |
| 2018/0189567 | A1 | 7/2018 | Maheriya et al. |
| 2019/0087002 | A1 | 3/2019 | Mani |
| 2019/0276051 | A1* | 9/2019 | Marti ............... B60K 37/06 |
| 2019/0290493 | A1* | 9/2019 | Lin ............... A61F 9/08 |

OTHER PUBLICATIONS

Corrected Notice of Allowance for U.S. Appl. No. 16/854,987 dated Nov. 25, 2020.
Notice of Allowance for U.S. Appl. No. 16/927,091 dated May 17, 2021.
Corrected Notice of Allowance for U.S. Appl. No. 16/927,091 dated Sep. 21, 2021.
Non-Final Office Action for U.S. Appl. No. 17/124,563 dated Sep. 2, 2021.
Corrected Notice of Allowance for U.S. Appl. No. 17/124,563 dated Mar. 23, 2022.
Notice of Allowance for U.S. Appl. No. 17/124,563 dated Jan. 3, 2022.
Corrected Notice of Allowance for U.S. Appl. No. 17/124,563 dated May 10, 2022.
Notice of Allowance for U.S. Appl. No. 17/460,460 dated Apr. 20, 2022.
Corrected Notice of Allowance for U.S. Appl. No. 17/496,662 dated Aug. 10, 2022.
Corrected Notice of Allowance for U.S. Appl. No. 17/460,460 dated Aug. 26, 2022.
Corrected Notice of Allowance for U.S. Appl. No. 17/496,662 dated Oct. 26, 2022.
Non-Final Office Action for U.S. Appl. No. 17/496,682 dated Oct. 6, 2022.
Non-Final Office Action for U.S. Appl. No. 17/716,057 dated Sep. 12, 2022.
Notice of Allowance for U.S. Appl. No. 17/496,662 dated Jul. 29, 2022.
Noice of Allowance for U.S. Appl. No. 17/716,057 dated Jan. 17, 2023.
Non-Final Office Action for U.S. Appl. No. 17/970,869 dated Feb. 13, 2023.
Notice of Allowance for U.S. Appl. No. 17/883,927 dated Dec. 19, 2022.
Notice of Allowance for U.S. Appl. No. 17/646,738 dated Dec. 7, 2022.
Notice of Allowance for U.S. Appl. No. 17/970,869 dated Jun. 16, 2023.
Notice of Allowance for U.S. Appl. No. 18/148,584 dated May 24, 2023.
Notice of Allowance for U.S. Appl. No. 17/496,682 dated Mar. 20, 2023.

* cited by examiner

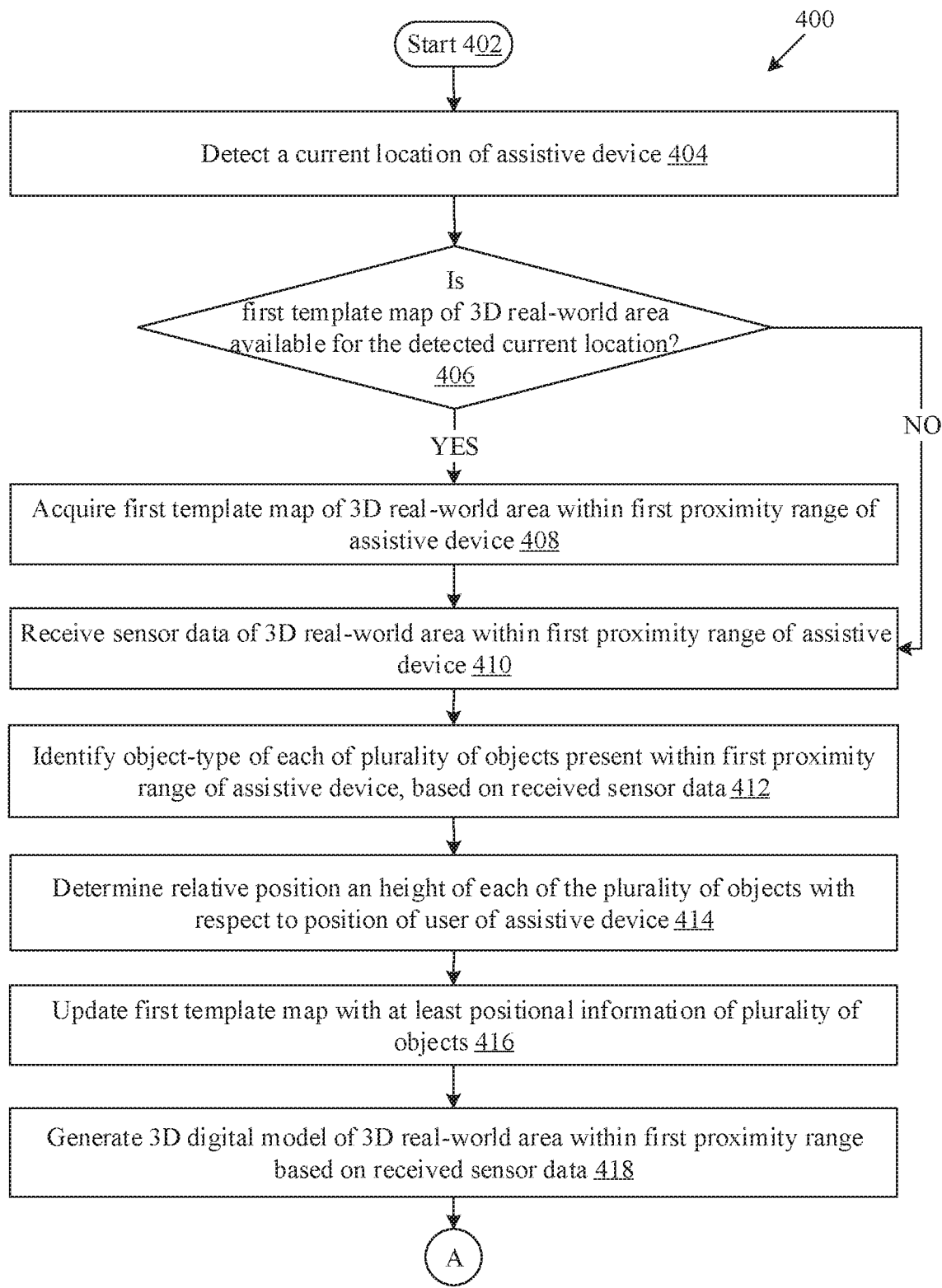

ASSISTIVE DEVICE FOR NON-VISUALLY DISCERNING A THREE-DIMENSIONAL (3D) REAL-WORLD AREA SURROUNDING A USER

REFERENCE

This patent application makes reference to, claims priority to, claims the benefit of, and is a Continuation Application of U.S. patent application Ser. No. 16/526,061, filed Jul. 30, 2019, which is a Continuation Application of U.S. patent application Ser. No. 15/709,793, filed Sep. 20, 2017.

The above referenced application is hereby incorporated herein by reference in its entirety.

FIELD

Various embodiments of the disclosure relate to assistive technologies. More specifically, various embodiments of the disclosure relate to an assistive device and method for non-visually discerning a three-dimensional (3D) real-world area surrounding a user.

BACKGROUND

With the growth of human-machine interaction (HMI) and sensor technologies, various types of assistive devices have been developed. However, technological developments in HMI are mostly focused on vision-based interaction technology. Humans have five traditional recognized senses, sight (ophthalmoception), hearing (audioception), taste (gustaoception), smell (olfacoception or olfacception), and touch (tactioception). The loss of one or more senses generally results in enhancement of one or more of the remaining senses to compensate for the lost sense(s). For people that have loss of sight or impaired sight, existing technology are typically focused on Braille based tactile presentation systems. A Braille character includes a fixed pattern, which is a three-row by two-column "6-dot Braille cell" or a four-row by two-column "8-dot Braille cell" with combinations of raised dots that represents letters of the alphabet, numbers and punctuation, and defined symbols. As existing technology are typically focused on Braille based tactile presentations, HMI for people that have loss of sight or impaired sight are usually limited to use of 8-keys Braille input, on-screen readers, or other tactile forms that are of limited functionality and use. It is known that the sense of touch has a much greater sensory resolution than the sense of sight. Hence, the sense of touch can detect even small changes on a surface that the eye cannot detect. These powerful non-visual senses, such as the sense of touch or hearing, may potentially be harnessed to help people that have lost or impaired the sense of sight to better understand and navigate in the world in an effective manner. These powerful non-visual senses may also be used in certain situations where human vision is of limited use, for example, in areas that are devoid or partially devoid of light. Thus, an advanced system may be required for non-visually discerning a three-dimensional (3D) real-world area surrounding a user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An assistive device and method for non-visually discerning a three-dimensional (3D) real-world area surrounding a user substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 4A and 4B, collectively, depict a flow chart that illustrates a method for non-visually discerning a 3D real-world area surrounding a user, in accordance with an embodiment of the disclosure.

DETAILED DESCRIPTION

Figure 1:
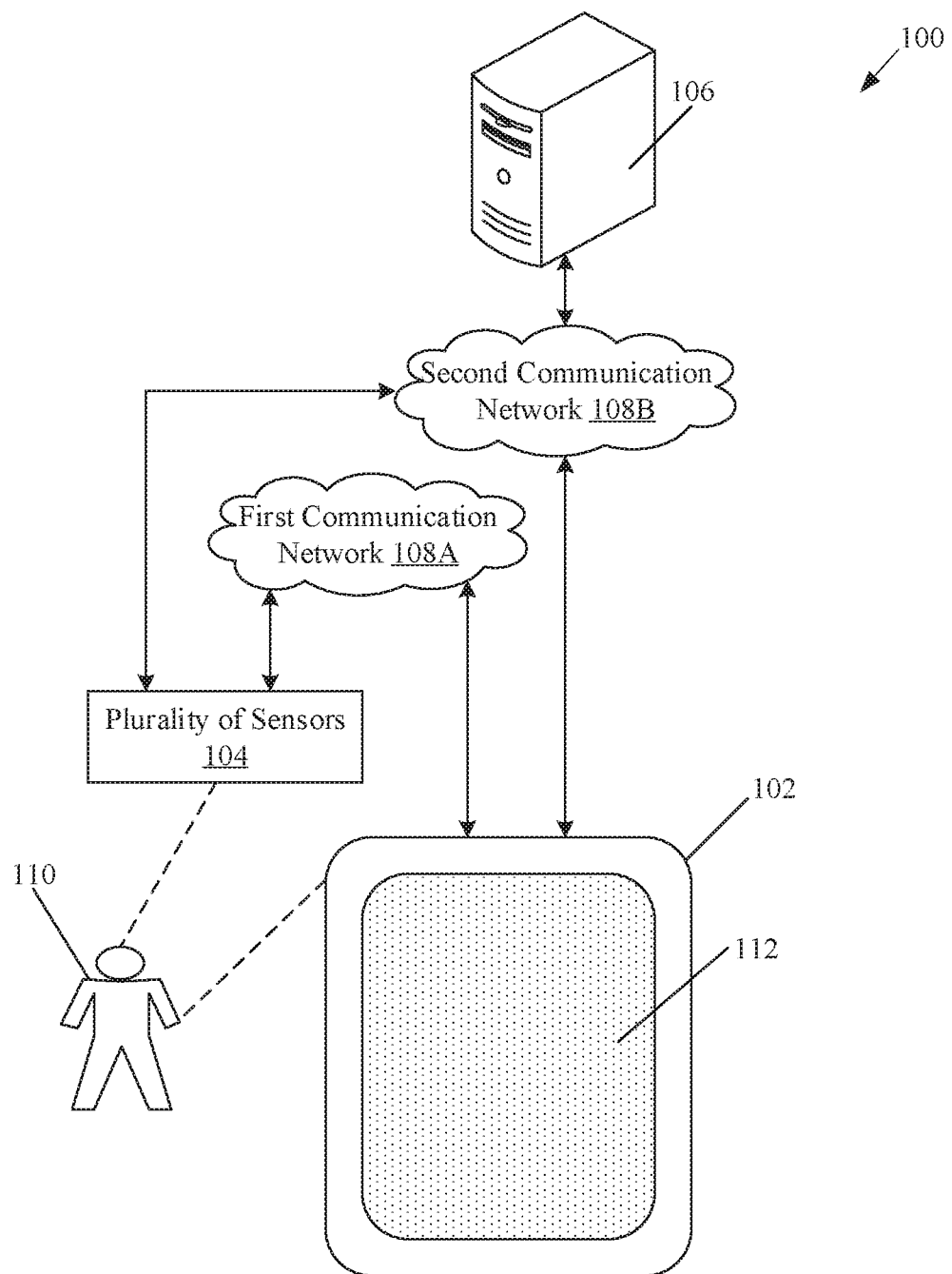
FIG. 1 illustrates an exemplary environment for non-visually discerning a three-dimensional (3D) real-world area surrounding a user, in accordance with an embodiment of the disclosure.

The following described implementations may be found in the disclosed assistive device and method for non-visually discerning a 3D real-world area surrounding a user. Exemplary aspects of the disclosure may include an assistive device that may include a haptic feedback interface comprising a plurality of haptic elements. The assistive device may further comprise a first circuitry configured to receive sensor data of a 3D real-world area within a first proximity range of the assistive device from a plurality of different types of sensors that are communicatively coupled to the assistive device. The assistive device may further comprise a second circuitry configured to establish a mapping of a plurality of objects within the first proximity range to the plurality of haptic elements in a defined region of the haptic feedback interface, based on the received sensor data. The assistive device may further include a haptic feedback generator configured to generate a touch-discernible feedback on the haptic feedback interface based on the established mapping. The touch-discernible feedback may comprise a plurality of differential touch-discernible cues to discern a 3D arrangement of each of the plurality of objects with respect to a position of a user of the assistive device. The plurality of differential touch-discernible cues refers to touch-discernible cues generated on the haptic feedback interface that may be dissimilar or different in one or more physical characteristics or properties such that a user may discern their disparate form by tacioperception. The one or more physical characteristics or properties, for example, may be shape, size, smoothness, roughness, temperature, amount of pressure, pain, level of elevation of a protrusion, a pattern of distribution of the cues, and the like, which may be discernible by touch.

In accordance with an embodiment, the touch-discernible feedback may correspond to at least one of a differential pressure-based, a differential temperature-based, a differential electric pulse-based, a differential raised shape pattern-based touch-discernible feedback, or a combination of different touch-discernible feedbacks. The second circuitry may be further configured to identify an object-type of each of the plurality of objects present within the first proximity range of the assistive device based on the received sensor data. The haptic feedback generator may be further configured to generate the plurality of differential touch-discernible cues to discern different identified object-types of the plurality of objects present within the first proximity range of the assistive device.

In accordance with an embodiment, the second circuitry may be further configured to determine a relative position and a height of each of the plurality of objects with respect to the position of the user of the assistive device for the 3D arrangement. The relative position of each of the plurality of objects with respect to the position of the user of the assistive device may be determined based on the sensor data received in real time or near-real time from the plurality of different types of sensors. In some embodiments, the plurality of different types of sensors may be worn by the user.

In accordance with an embodiment, the second circuitry may be further configured to generate a 3D digital model of the 3D real-world area within the first proximity range, based on the received sensor data. The generated 3D digital model may be utilized for the mapping of the plurality of objects within the first proximity range to the plurality of haptic elements. In some embodiments, the second circuitry may be configured to acquire a first template map of the 3D real-world area within the first proximity range of the assistive device from a server based on the position of the user. The first template map may then be updated with at least positional information of the plurality of objects. The update may be done based on the sensor data of the 3D real-world area within the first proximity range of the assistive device received from the plurality of different types of sensors in real time or near-real time.

In accordance with an embodiment, the circuitry may be further configured to determine a scaling factor in accordance with the first proximity range selected on the assistive device for the mapping of the plurality of objects within the first proximity range to the plurality of haptic elements in the defined region of the haptic feedback interface. The mapping of the plurality of objects within the first proximity range may be updated to the plurality of haptic elements in the defined region of the haptic feedback interface. The mapping update may be done based on a change in position of one or more movable objects of the plurality of objects or the user, detected in real time or near-real time from the received sensor data.

In accordance with an embodiment, the haptic feedback generator of the assistive device may be configured to dynamically update the touch-discernible feedback on the haptic feedback interface based on the update of the mapping. The updated touch-discernible feedback may comprise a change in the relative position of one or more of the plurality of objects with respect to the position of the user of the assistive device. In some embodiments, the haptic feedback generator may be further configured to output an audio feedback in combination with the touch-discernible feedback to enable non-visual discern of the 3D real-world area within the first proximity range of the assistive device by the user as the user moves from a first location to a second location in the 3D real-world area within the first proximity range.

In accordance with an embodiment, the assistive device may comprise a learning engine in a memory of the assistive device. The second circuitry may be further configured to determine one or more patterns in a plurality of user interactions on the haptic feedback interface over a period of time based on monitoring or tracking of a usage pattern of the assistive device by the learning engine. The second circuitry may be further configured to adapt the mapping of the plurality of objects within the first proximity range to the plurality of haptic elements in the defined region of the haptic feedback interface based on the determined one or more patterns. In accordance with an embodiment, the haptic feedback interface is a haptic input/output interface. In some embodiments, the assistive device further comprises a haptic feedback controller. The haptic feedback controller may be configured to detect a haptic input on the haptic feedback interface, based on a press on at least one of the plurality of differential touch-discernible cues generated in the touch-discernible haptic feedback.

FIG. 1 illustrates an exemplary environment for non-visually discerning a three-dimensional (3D) real-world area surrounding a user, in accordance with an embodiment of the disclosure. With reference to FIG. 1, there is shown an exemplary environment 100. The exemplary environment 100 may include an assistive device 102, a plurality of sensors 104, a server 106, a first communication network 108A, a second communication network 108B, and one or more users, such as a user 110. The assistive device 102 may include a haptic feedback interface 112. The assistive device 102 may be communicatively coupled to the plurality of sensors 104 via the first communication network 108A or the second communication network 108B. The assistive device 102 may be communicatively coupled to the server 106 via the second communication network 108B.

The assistive device 102 may refer to a special-purpose device to provide assistance to a user, such as the user 110, of the assistive device 102 for non-visually discerning any 3D real-world area surrounding the user 110. The 3D real-world area surrounding the user 110 may be an indoor area or an outdoor area. The assistive device 102 may include suitable logic, circuitry, and/or code to generate a touch-discernible feedback on the haptic feedback interface 112. The touch-discernible feedback on the haptic feedback interface 112 may enable the user 110 to discern the 3D real-world area surrounding the user 110. In accordance with an embodiment, the touch-discernible feedback may be 3D touch-discernible feedback generated based on the sensor data of the 3D real-world area surrounding the user 110 received from the plurality of sensors 104.

In some embodiments, the assistive device 102 may be implemented as a hand-held portable device. In some embodiments, the assistive device 102 may be implemented as one or more wearable devices that may be worn around at different parts of the human body having sensory receptors that senses touch. It is known that the somatic sensory system of human body is responsible for the sense of touch. The somatic sensory system has sensory touch or pressure receptors that enable a human to feel when something comes into contact with skin. The sense of touch may also be referred to as somatic senses or somesthetic senses that include proprioception (e.g. sense of position and movement) or haptic perception. Typically, such sensory receptors for sense of touch are present, for example, on the skin, epithelial tissues, muscles, bones and joints, and even on certain internal organs of the human body. Examples of implementation of the assistive device 102 may include, but are not limited to a special-purpose portable assistive device, special-purpose hand gloves, special-purpose shoes, or a wearable device that may be worn as a wrist band, wrapped around arms, or any part of human body or as a shoe sole.

The plurality of sensors 104 may comprise suitable logic, circuitry, and/or interfaces that may be configured to detect one or more cues of the 3D real-world area surrounding the user 110, and generate a corresponding output, such as sensor data. The plurality of sensors 104 may include wearable sensors that may be worn by the user 110, sensors that may be integrated with the assistive device 102, or other personal devices, such as a smartphone, of the user 110. The plurality of sensors 104 refers to a plurality of different types of sensors. Examples of the plurality of sensors 104 may include, but are not limited to, a motion sensor (such as an accelerometer and a gyroscope), a location sensor (such as a global positioning system (GPS) sensor), a direction detecting sensor (such as a compass or magnetometer), an image-capture device (such as a stereoscopic camera, 360 degree camera, a wide-angle camera, or other image sensors), an atmospheric pressure detection sensor (such as a barometer), a depth sensor, an altitude detection sensor (such as altimeter), a lux meter, a radio frequency (RF) sensor, an ultrasound sensor, or an object detection sensor (such as Radar, Light Detection and Ranging (LIDAR), and an infrared (IR) sensor).

The server 106 may comprise suitable logic, circuitry, interfaces, and/or code that may be configured to store satellite imagery, street maps, and 360 degree panoramic views of streets of various geographical areas. In some embodiments, the server 106 may be configured to communicate a first template map of the 3D real-world area for a location of the assistive device 102, based on a template map request for the location received from the assistive device 102. In accordance with an embodiment, the server 106 may be configured to store historical usage pattern data of a plurality of different users, such as the user 110. Examples of the server 106 may include, but are not limited to, a cloud server, an application server, a database server, a web server, a file server, and/or their combination.

The first communication network 108A may be a medium that may enable communication between the assistive device 102 and the plurality of sensors 104. The first communication network 108A may be implemented by one or more wired or wireless communication technologies known in the art. The first communication network 108A may refer to a short-range or medium-range wireless communication network. Examples of wireless communication networks may include, but are not be limited to, a Wireless-Fidelity (Wi-Fi) based network, a Light-Fidelity (Li-Fi) based network, a wireless personal area network (WPAN) such as a BLUETOOTH™ network, Internet-of-Things (IoT) network, Machine-Type-Communication (MTC) network, and/or a Wi-Max based network.

The second communication network 108B may be a medium that may facilitate communication between the assistive device 102 and the server 106. The second communication network 108B may be implemented by one or more wireless communication technologies known in the art. Examples of the wireless communication networks may include, but not limited to, the Internet, a cloud network, a wireless wide area network (WWAN), a Local Area Network (LAN), a plain old telephone service (POTS), a Metropolitan Area Network (MAN), or a cellular or mobile network, such as Global System for Mobile Communications (GSM), General Packet Radio Service (GPRS), Enhanced Data Rates for GSM Evolution (EDGE), 1G, 2G, 3G, 4G Long Term Evolution (LTE), 5G, IEEE 802.11, 802.16, and the like.

The haptic feedback interface 112 may comprise a plurality of haptic elements. In accordance with an embodiment, the haptic feedback interface 112 may refer to a haptic output interface configured to provide at least a touch-discernible output to the user 110. In some embodiments, the haptic feedback interface 112 may refer to a haptic input/output (I/O) interface configured to receive haptic input as well as provide haptic output to the user 110 from the same haptic I/O interface. It is known that the sense of touch has a much greater sensory resolution than the sense of sight. Hence, the sense of touch can detect even small changes on a surface that the eye cannot detect. This principle of the sense of touch may be used to guide the design of the haptic feedback interface 112.

In accordance with an embodiment, the user 110 may be a person who have lost or impaired the sense of sight. The user 110 may want to learn and understand about the surrounding world. It is known that sighted people visualize the surrounding world by detection of edges between areas of different wavelengths of light, which is then perceived as different colors by the brain. Based on feedback from the visual system, visual part of the brain referred to as visual cortex, processes visual information of the surrounding world to enable the sighted people to visualize the surrounding world. Information about the features on the surface of an object, like color and shading, provide certain clues about its identity. It is also known the loss of one or more senses, such as the sense of sight, generally results in enhancement of one or more of the remaining senses, such as sense of touch, hearing, smell, or taste, to compensate for the lost sense(s). The assistive device 102 harnesses the non-visual senses, such as the sense of touch, hearing, or smell, to assist users, such as the user 110, who have lost or impaired the sense of sight for enhanced and accurate understanding of the 3D real-world area surrounding the user 110. The assistive device 102 may also be used even by sighted people in certain situations where human vision is of limited use, for example, in areas that are devoid or partially devoid of light, for example, during night to augment sense of sight using other human senses, such as audioception, olfacoception, and tactioception.

In operation, the assistive device 102 may be configured to receive sensor data of the 3D real-world area within the first proximity range of the assistive device 102 from a plurality of different types of sensors (such as the plurality of sensors 104) that are communicatively coupled to the assistive device 102. The plurality of different types of sensors, for example, may include the location sensor, the motion sensor, the image-capture device, the RF sensor, the ultrasound sensor, the IR sensor, or other types of object detection sensor (such as Radar or LIDAR). The image-capture device may refer to a stereoscopic camera, 360-degree camera, a night vision camera, a wide-angle camera, or other image sensors or their combination. Thus, in certain scenarios, where one type of sensor may not capture accurate information of the 3D real-world area within the first proximity range of the assistive device 102, other types of sensors may compliment and capture information of the 3D real-world area.

In accordance with an embodiment, the plurality of different types of sensors (such as the plurality of sensors 104) may include sensors, for example, rain sensors, altimeter, lux meter, barometer, and the like, that senses environmental conditions and/or characteristics, such as weather conditions or lighting conditions). Based on the environmental conditions and/or characteristics, information of the 3D real-world area acquired from a first group of sensors of the plurality of different types of sensors may be assigned a higher weigh value (i.e. preferable) than information acquired from a second group of sensors of the plurality of different types of sensors. The classification of sensors in the first group of sensors and the second group of sensors may be done based on defined criteria and the sensed environmental conditions and/or characteristics. The defined criteria, for example, may be defined rules based on known accuracy of information detected in different environment conditions from each sensor. For example, in certain weather condition, the information, such as images captured from the image-capture device may not be useful. In such cases, the sensor data from the RF sensor, LIDAR, ultrasound sensor, may be provided higher weight value as compared to the sensor data from the image-capture device.

The assistive device 102 may be configured to identify the object-type of each of the plurality of different objects present within the first proximity range of the assistive device 102 based on the received sensor data. The assistive device 102 may be configured to determine a relative position of each of the plurality of objects with respect to the position of the user 110 of the assistive device 102. The relative position of each of the plurality of objects may be determined based on the sensor data received in real time or near-real time from the plurality of sensors 104. In some embodiments, the assistive device 102 may be configured to determine a height of each of the plurality of objects from the perspective of the user 110 of the assistive device 102. As the sensor data is received from different input sources (i.e. the plurality of different types of sensors), the information from each sensor may be processed concurrently and information from one sensor may compliment information from other sensor, thereby increasing accuracy of identification of the object-type, and the relative position of each of the plurality of objects with respect to the position of the user 110 of the assistive device 102.

In accordance with an embodiment, the assistive device 102 may be configured to compute a scaling factor in accordance with the first proximity range and an area of the haptic feedback interface 112 on which a haptic feedback is to be generated. The assistive device 102 may be configured to generate a 3D digital model of the 3D real-world area within the first proximity range. The 3D digital model of the 3D real-world area surrounding the user 110 may be generated based on the received sensor data. The determined relative position, the height, and the identified object-type of each of the plurality of different objects, may also be used to generate the 3D digital model of the 3D real-world area surrounding the user 110. As the sensor data is received from different input sources (i.e. the plurality of different types of sensors), the computation of the relative position of each of the plurality of objects with respect to the position of the user 110 of the assistive device 102, may be faster and more accurate as compared to sensor data received exclusively from one type of sensor, such as the image-capture device or in different environmental or weather conditions, for example, rain, hailstorm, during night, and the like. Although, an approximate distance of different objects in an image frame may be estimated by image processing, the distance or position of objects calculated from RF sensor or the LIDAR, may be faster and more accurate as compared to the image-processing methods. This helps to quickly and accurately generate the 3D digital model of the 3D real-world area surrounding the user 110 based on the sensor data received from the plurality of different types of sensors (such as the plurality of sensors 104).

The assistive device 102 may be configured to establish a mapping of the plurality of objects within the first proximity range to the plurality of haptic elements of the haptic feedback interface 112, based on the received sensor data. In accordance with an embodiment, the generated 3D digital model may be utilized for the mapping of the plurality of objects within the first proximity range to the plurality of haptic elements.

In accordance with an embodiment, the assistive device 102 may be configured to generate a touch-discernible feedback on the haptic feedback interface 112 based on the established mapping. The touch-discernible feedback may correspond to at least one of a differential pressure-based, a differential temperature-based, a differential electric pulse-based, a differential raised shape pattern-based touch-discernible feedback. In some embodiments, a combination of different touch-discernible feedback, for example, a combination of the differential electric pulse-based and the differential raised shape pattern-based touch-discernible feedback may be employed. The touch-discernible feedback may comprise a plurality of differential touch-discernible cues to discern a 3D arrangement of each of the plurality of objects with respect to a position of the user 110 of the assistive device 102. The 3D arrangement of each of the plurality of objects may refer to an overall arrangement of the plurality of objects in a 3D physical space, such as the 3D real-world area surrounding the user 110. As the plurality of differential touch-discernible cues also include a touch-discernible cue that indicates the position of the user 110 in the generated touch-discernible feedback on the haptic feedback interface 112, the 3D arrangement of each of the plurality of objects from a perspective of user 110 may provide an indication to the user 110 as to where the user 110 is currently present in the 3D real-world area with respect to or in relation to other objects of the plurality of objects. It may be advantageous to include at least one touch-discernible cue that indicates the position of the user 110 in the generated touch-discernible feedback itself as it enables the user 110 to easily discern the 3D real-world area from the perspective of the user 110 by a touch on the differential touch-discernible cues. An exemplary touch-discernible feedback and exemplary differential touch-discernible cues are shown and described, for example, in FIG. 3C.

In some embodiments, the assistive device 102 may be configured to control the output of an audio feedback via one or more audio-output devices provided in the assistive device 102. The audio feedback may be provided in-sync with the generated touch-discernible feedback. The audio feedback may be generated as the user 110 moves from a first location to a second location in the 3D real-world area within the first proximity range. For example, as the user 110 moves from the first location to a new location (such as the second location) in the 3D real-world area, the audio feedback in combination with the touch-discernible feedback may provide an enhanced understanding of the nearby environment of the user 110 for navigation.

In accordance with an embodiment, the assistive device 102 may be configured to update the mapping of the plurality of objects to the plurality of haptic elements on the defined region of the haptic feedback interface 112. The update may be done based on a change in position of one or more movable objects of the plurality of objects including the user 110. The assistive device 102 may be configured to detect the change in real time or near-real time from the received sensor data. For example, when one or more objects of the plurality of objects moves in the 3D real-world area, the generated 3D model at the assistive device 102, may also be updated. Thereafter, the touch-discernible feedback generated previously may be dynamically updated on the haptic feedback interface 112 based on the update of the mapping. Thus, after an initial generation of the touch-discernible feedback, certain portion(s) of the haptic feedback interface 112 needs to be updated instead of entire haptic feedback interface 112. Thus, the update may be done quickly. In some embodiments, the update may occur periodically. In some embodiments, the update may be done in real time or near-real time continually as the one or more objects of the plurality of objects moves in the 3D real-world area. The updated touch-discernible feedback enables the user 110 to constantly discern changes in the 3D real-world area surrounding the user 110.

Figure 2:
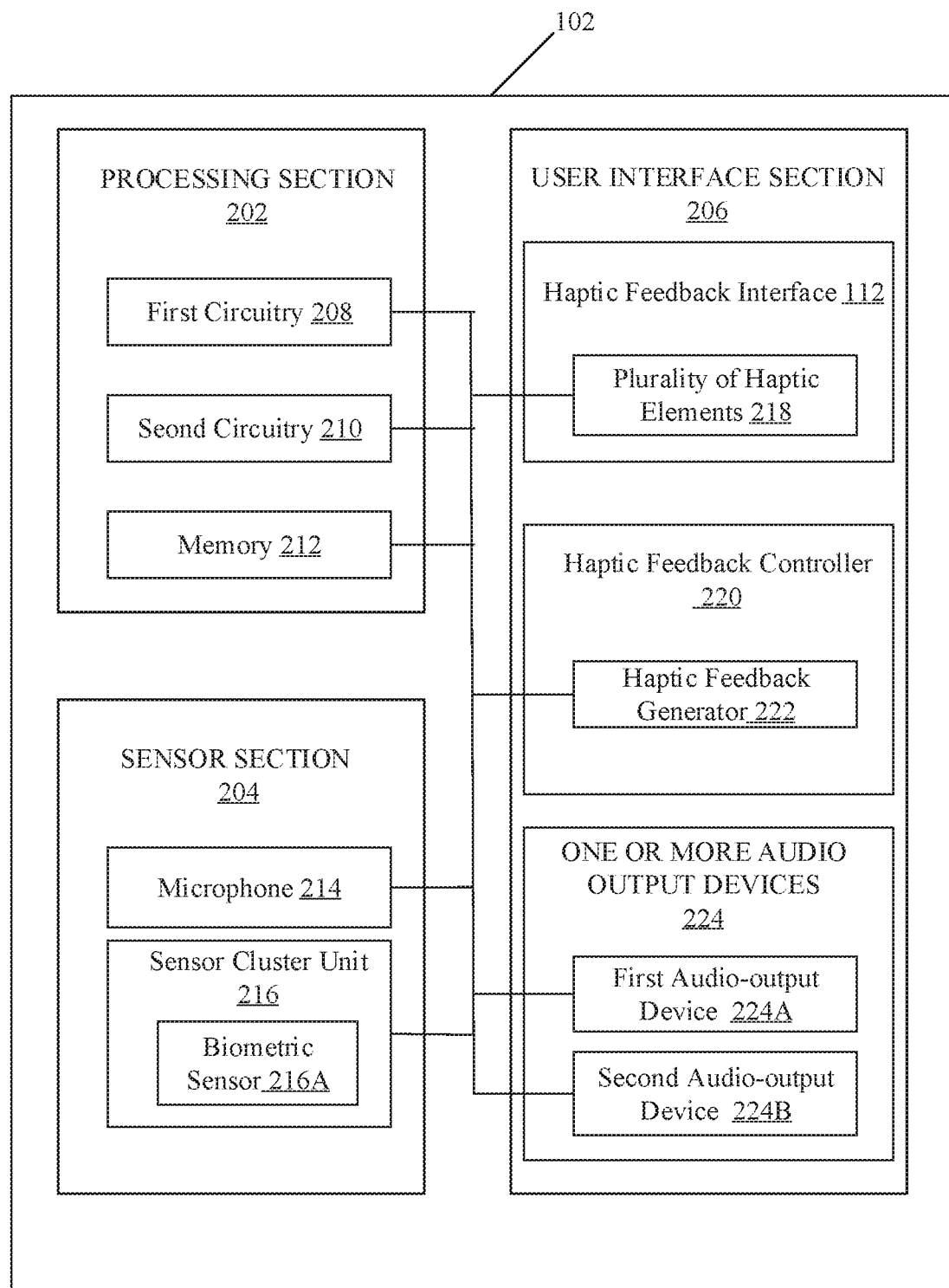
FIG. 2 is a block diagram that illustrates an exemplary assistive device for non-visually discerning a 3D real-world area surrounding a user of the assistive device, in accordance with an embodiment of the disclosure.

FIG. 2 is a block diagram that illustrates an exemplary assistive device for non-visually discerning a 3D real-world area surrounding a user of the assistive device, in accordance with an embodiment of the disclosure. FIG. 2 is explained in conjunction with elements from FIG. 1. With reference to FIG. 2, there is shown the assistive device 102. The assistive device 102 may include a processing section 202, a sensor section 204, and a user interface section 206. The processing section 202 may include a first circuitry 208, a second circuitry 210, and a memory 212. The sensor section 204 may include a microphone 214 and a sensor cluster unit 216. The sensor cluster unit 216 may include at least a biometric sensor 216A. The user interface section 206 may include the haptic feedback interface 112, a haptic feedback controller 220, and one or more audio-output devices, such as a first audio-output device 224A and a second audio-output device 224B. The haptic feedback interface 112 may include a plurality of haptic elements 218. The haptic feedback controller 220 may include a haptic feedback generator 222.

In accordance with an embodiment, the assistive device 102 may be communicatively coupled to the plurality of sensors 104 through the first communication network 108A and/or the second communication network 108B, by use of the first circuitry 208. The second circuitry 210 may be communicatively coupled to the memory 212, and the various components of the sensor section 204 and the user interface section 206, via a system bus.

The first circuitry 208 may comprise suitable logic, circuitry, interfaces, and/or code that may be configured to receive sensor data of the 3D real-world area within a first proximity range of the assistive device 102. The sensor data of the 3D real-world area may be received from the plurality of sensors 104, via the first communication network 108A. In some embodiments, the one or more sensors of the plurality of sensors 104 may be provided as a part of the sensor cluster unit 216 as integrated sensors. In such a case, the sensor data may be acquired by the system bus for processing by the second circuitry 210. The first circuitry 208 may be further configured to communicate with external devices, such as the server 106, via the second communication network 108B. The first circuitry 208 may implement known technologies to support wireless communication. The first circuitry 208 may include, but are not limited to, a transceiver (e.g. a radio frequency (RF) transceiver), an antenna, one or more amplifiers, a tuner, one or more oscillators, a digital signal processor, a coder-decoder (CODEC) chipset, a subscriber identity module (SIM) card, and/or a local buffer.

The first circuitry 208 may communicate via wireless communication with networks, such as the Internet, an Intranet and/or a wireless network, such as a cellular telephone network, a wireless local area network (WLAN), a personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), BLUETOOTH™, Wireless Fidelity (Wi-Fi) (such as IEEE 802.11a, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Li-Fi, Machine-Type-Communication (MTC) technology, a protocol for email, instant messaging, and/or Short Message Service (SMS).

The second circuitry 210 may refer a digital signal processor (DSP). The second circuitry 210 may comprise suitable logic, circuitry, interfaces, and/or code that may be configured to generate a 3D digital model of the 3D real-world area within the first proximity range based on the received sensor data from the plurality of sensors 104 (or the sensor cluster unit 216). The generated 3D digital model may be mapped to the plurality of haptic elements 218 of the haptic feedback interface 112. The assistive device 102 may be a programmable device, where the second circuitry 210 may execute instructions stored in the memory 212. Other implementation examples of the second circuitry 210 may include, but are not limited to a specialized DSP, a Reduced Instruction Set Computing (RISC) processor, an Application-Specific Integrated Circuit (ASIC) processor, a Complex Instruction Set Computing (CISC) processor, and/or other processors.

The memory 212 may comprise a learning engine. The second circuitry 210 may be configured to determine one or more patterns in a plurality of user interactions on the haptic feedback interface 112 over a period of time based on a track of a usage pattern of the assistive device 102 by the learning engine. The memory 212 may include suitable logic, circuitry, and/or interfaces that may be configured to store a set of instructions executable by the second circuitry 210. The memory 212 may be further configured to temporarily store one or more captured media streams, such as one or more videos or images of the 3D real-world area within the first proximity range (i.e. an area surrounding the user 110) as image buffer for processing by the second circuitry 210. The memory 212 may also store usage history, an amount of pressure exerted by the user 110 while touching the haptic feedback interface 112 in the plurality of user interactions on the haptic feedback interface 112 over a period of time. The memory 212 may also store input and output preference settings by the user 110. Examples of implementation of the memory 212 may include, but not limited to, a random access memory (RAM), a dynamic random access memory (DRAM), a static random access memory (SRAM), a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The microphone 214 may comprise suitable circuitry and/or interfaces to receive an audio input. In accordance with an embodiment, the audio input may be provided by the user 110. The audio input may correspond to a voice input to the assistive device 102. In accordance with an embodiment, the microphone 214 may be muted or disabled in accordance with user preferences. Although FIG. 2 shows a single microphone, a person of ordinary skill in the art may understand that the assistive device 102 may include multiple microphones to capture sound emanating from the first proximity range of the user 110 of the assistive device 102. In some embodiments, the assistive device 102 may include a plurality of microphones. Each microphone of the plurality of microphones may be fitted at different locations of the assistive device 102. Based on a difference in the time of receipt of a sound emanated from an object of the plurality of objects in the 3D real-world area, at each of microphone of the plurality of microphones, a direction of the object may be determined. For example, four microphones may be placed at four sides (left, right, top, and bottom) of the assistive device 102. In cases, a sound signal from an object, such as a human or vehicle horn, may be received first at the left microphone, followed by front microphone, and then at remaining microphones. This may indicate that the object may be located at 45-degree angle between left and front direction with respect to the current orientation of the assistive device 102. This information, such as the determined direction of the object, may then be utilized during generation of the touch-discernible feedback or the audio feedback to discern the 3D arrangement of the plurality of objects in the 3D real-world area, as discussed in the FIGS. 2, 3A, 3B, 3C, and 3D.

The sensor cluster unit 216 may include a biometric sensor 216A, such as a fingerprint sensor, to decipher the identity of a user, such as the user 110. In certain scenarios, the assistive device 102 may be used my multiple users, for example, users of a same family. In such a case, based on user authentication by use of the biometric sensor, a different usage profile and user settings may be loaded for different users. In some embodiments, the sensor cluster unit 216 may also include a temperature sensor and a pressure sensor to gauge pressure applied by a user, such as the user 110, on the haptic feedback interface 112. In some embodiments, one or more sensors of the plurality of sensors 104 may be a part of the sensor cluster unit 216. For example, the sensor cluster unit 216 may include the location sensor, the image sensor, the RF sensor, the accelerometer, the gyroscope, the compass, the magnetometer, an integrated image-capture device, the depth sensor, the altimeter, a lux meter, an ultrasound sensor, the IR sensor, or one or more weather sensors.

The haptic feedback interface 112 may comprise the plurality of haptic elements 218. The plurality of haptic elements 218 may refer to an array of cylindrical tubes arranged at the surface of the haptic feedback interface 112. A person of ordinary skill in the art may understand that shape of each tube may be variable, such as conical, hexagonal, or other polygonal shapes, without departing from the scope of the disclosure. In accordance with an embodiment, the plurality of haptic elements 218 may be arranged as a layer (of array of cylindrical tubes) on the haptic feedback generator 222 such that a haptic signal may be generated by the haptic feedback generator 222 through each of the plurality of haptic elements 218. In accordance with an embodiment, one end (e.g. a proximal end) of each tube of the array of cylindrical tubes may be coupled to the haptic feedback generator 222, and the other end (e.g. a distal end) may be interspersed on the haptic feedback interface 112 such that a plurality of differential touch-discernible cues generated by the haptic feedback generator 222 in conjunction with the plurality of haptic elements 218 are discernible on the haptic feedback interface 112 by the sense of touch.

The haptic feedback controller 220 may comprise suitable circuitry and interfaces to control output of a touch-discernible feedback on the haptic feedback interface 112 by the haptic feedback generator 222. The haptic feedback controller 220 may be configured to sense a haptic user input via plurality of haptic elements 218 based on a defined amount of pressure detected at one or more haptic elements of the plurality of haptic elements 218. The haptic feedback controller 220 includes the haptic feedback generator 222. The haptic feedback generator 222 may comprise suitable circuitry and interfaces to receive mapping information from the second circuitry 210. The mapping information corresponds to the mapping of the 3D digital model that includes a plurality of objects of the 3D real-world area within the first proximity range to the plurality of haptic elements 218. The haptic feedback generator 222 may be configured to generate a touch-discernible feedback on the haptic feedback interface 112 based on the established mapping. The touch-discernible feedback comprises a plurality of differential touch-discernible cues generated on the haptic feedback interface 112 by use of the plurality of haptic elements 218 to enable the user 110 to non-visually discern the 3D real-world area surrounding the user 110 within the first proximity range.

The one or more audio-output devices 224, such as the first audio-output device 224A and the second audio-output device 224B, may comprise suitable circuitry and/or interfaces to generate an audio output for the user 110. In accordance with an embodiment, the audio output may be generated in-sync with the touch-discernible feedback generated on the haptic feedback interface 112. In accordance with an embodiment, the audio output may be generated in-sync with a haptic input received on the haptic feedback interface 112 for multi-sense discern of the touch-discernible feedback for enhanced understanding of the surrounding of the user 110. The haptic input may be detected by the haptic feedback controller 220 by use of the pressure sensor of the sensor cluster unit 216. In accordance with an embodiment, the one or more audio-output devices 224 may be muted or disabled based on a time-of-day or for a specific location, such as a public library where silence is solicited. Though FIG. 2 is shown to include two audio-input devices, a person of ordinary skill in the art may understand that the assistive device 102 may include a single audio-input device, or more than two audio-input devices. The other speakers may be placed at corners, for example, at extreme left and right corners of the assistive device 102, to aid in voice-based navigation of the user 110 as the user 110 moves with the assistive device 102 from one location to another location in the 3D real-world area. In some embodiments, one or more audio-input devices may be provided or worn at different parts of the body of the user 110 for voice-based navigation of the user 110 as the user 110 moves with the assistive device 102 from one location to another location in the 3D real-world area. Such voice-based navigation may be provided in combination to the generated touch-discernible feedback, which may act synergistically to provide enhanced navigation assistance to the user 110 in real time or near-real time as the user 110 moves in the 3D real-world area. An example is described below in FIG. 2 and FIG. 3C.

In operation, the second circuitry 210 may be configured to detect a current location of the assistive device 102, by use of the location sensor. As the user 110 may be equipped with the assistive device 102, the location of the assistive device 102 may be same as that of the user 110. The location sensor may be an integrated sensor of the assistive device 102 provided in the sensor cluster unit 216 or may be one of the plurality of sensors 104. The assistive device 102 may be a hand-held device or a wearable device. The second circuitry 210 may be configured to check whether a first template map of a 3D real-world area for the detected current location of the assistive device 102, is available. In some embodiments, where the first template map of the 3D real-world area is available, the first circuitry 208 may be configured to acquire the first template map of the 3D real-world area within the first proximity range (e.g. the first proximity range 304) of the assistive device 102. The first template map may be acquired from the server 106 based on the current location of the assistive device 102. In some embodiments, the memory 212 may store 2D/3D maps of geographical regions of the earth surface, such as street views. In such a case, the second circuitry 210 may be configured to retrieve the first template map of the 3D real-world area from the memory 212. The first template map may be available for certain outdoor areas, whereas such maps may not be available for indoor areas.

In accordance with an embodiment, the first circuitry 208 may be configured to receive sensor data of the 3D real-world area within the first proximity range of the assistive device 102 from the plurality of sensors 104 that are communicatively coupled to the assistive device 102. In some embodiments, the sensor data may also be received from the sensor cluster unit 216. In some embodiments, the first template map of a 3D real-world area may not be acquired, for example, in case of indoor locations or for regions where the first template map may not be available. In such a case, the sensor data of the 3D real-world area received in real time or near-real time may be used to collect information of the 3D real-world area within the first proximity range of the assistive device 102.

In accordance with an embodiment, the second circuitry 210 may be further configured to identify the object-type of each of the plurality of different objects present within the first proximity range of the assistive device 102 based on the received sensor data. The second circuitry 210 may be configured to determine a relative position of each of the plurality of objects with respect to the position of the user 110 of the assistive device 102. The relative position of each of the plurality of objects may be determined based on the sensor data received in real time or near-real time from the plurality of sensors 104 worn by the user 110. The second circuitry 210 may be configured to determine a height of each of the plurality of objects from the perspective of the height of the user 110 of the assistive device 102.

In accordance with an embodiment, the second circuitry 210 may be configured to update the first template map in real time or near-real time based on the sensor data of the 3D real-world area. The second circuitry 210 may be configured to generate a 3D digital model of the 3D real-world area, based on the received sensor data. The second circuitry 210 may be further configured to compute a scaling factor in accordance with the first proximity range and a surface area of the haptic feedback interface 112 or a surface area of a defined region of the haptic feedback interface 112. The defined region of the haptic feedback interface 112 may refer to an overall surface area of the haptic feedback interface 112 on which a haptic feedback is to be generated. An example of the defined region (e.g. the defined region 322) of the haptic feedback interface 112 is shown in FIGS. 3C and 3D.

In accordance with an embodiment, the second circuitry 210 may be configured to establish a mapping of the plurality of objects to the plurality of haptic elements 218 in the defined region of the haptic feedback interface 112, based on the received sensor data. In accordance with an embodiment, the generated 3D digital model may be utilized for the mapping of the plurality of objects within the first proximity range to the plurality of haptic elements 218.

In accordance with an embodiment, the haptic feedback generator 222 may be configured to generate a touch-discernible feedback on the haptic feedback interface 112 based on the established mapping. The touch-discernible feedback may comprise a plurality of differential touch-discernible cues to discern a 3D arrangement of each of the plurality of objects with respect to a position of the user 110 of the assistive device 102. The haptic feedback generator 222 generates the plurality of differential touch-discernible cues such that the user 110 can discern different identified object-types of the plurality of objects present within the first proximity range of the assistive device 102.

The plurality of differential touch-discernible cues refers to touch-discernible cues generated on the haptic feedback interface that may be dissimilar or different in one or more physical characteristics or properties such that a user may discern their disparate form by tacioperception. The one or more physical characteristics or properties, for example, may be shape, size, smoothness, roughness, temperature, amount of pressure, pain, level of elevation, a pattern of distribution, and the like, which may be discernible by touch. In accordance with an embodiment, the plurality of differential touch-discernible cues may be generated as a plurality of protrusions of different shapes that are extended from the surface of the haptic feedback interface 112. Each protrusion may be a raised shape-pattern or a bulge that sticks out from at least one or a group of haptic elements of the plurality of haptic elements 218 of the haptic feedback interface 112. The plurality of protrusions represents the plurality of objects of the 3D real-world area within the first proximity range. One shape may be assigned to one identified object-type of the plurality of objects of the 3D real-world area within the first proximity range to enable the user 110 to discern the object-type when the user 110 touches a protrusion of a defined shape. For example, an oval shape protrusion may denote a particular object-type, for example, a car. Examples of the oval shape protrusions may be the touch-discernible cues 324c and 324d, as shown in FIG. 3C. A round protrusion may denote a human being. Examples of the round protrusion may be the touch-discernible cues 324a and 324b, as shown in FIG. 3C. A square-shaped protrusion may denote a building, and a pole-like or a spike-like protrusion may denote a pillar or a pole in the 3D real-world area within the first proximity range. Examples of the square-shaped protrusions may be the touch-discernible cues 324f, 324g, and 324h, as shown in FIG. 3C. An example of the pole-like or a spike-like protrusion may be the touch-discernible cue 324e as shown in FIG. 3C. Thus, when the user 110 touches the oval shape protrusion, the user 110 may readily identify the protrusion to be a car. Thus, similar to the sighted people who use information about the features on the surface of an object, like color, shading, or overall size, and shape, to recognize an object, the people who have lost the sense of sight may also identity an object based on a touch on the protrusion of a defined shape, where an association of a particular shape with a particular object-type is learned by the brain.

In accordance with an embodiment, the plurality of protrusions generated on the haptic feedback interface 112 enables the user 110 to discern not only the object-type but also a relative positioning of the plurality of objects from the perspective of the user 110. Further, as the plurality of objects are mapped to the plurality of haptic elements 218 of the haptic feedback interface 112, a 3D arrangement of the plurality of objects is discernible by touch on the plurality of differential touch-discernible cues that are generated as the plurality of protrusions of different shapes extended from the surface of the haptic feedback interface 112. The 3D arrangement may indicate not only the position or distance of each object of the plurality of objects from the user 110 of the assistive device 102, but also may indicate a relative size or direction of travel of objects for moving objects.

In accordance with an embodiment, the plurality of protrusions may be of same shapes. In such a case, although it may be relatively difficult to identity an object-type, however, the relative position of each of the plurality of objects from the position of the user 110 may be easily discernible by touch on the plurality of protrusions. Further, as the user 110 is present in the 3D real-world area, the user 110 may hear actual sound emanated from one or more objects of the plurality of objects. Hence, the user 110 may correlate the plurality of protrusions with the plurality of sounds to discern an object-type or estimate an approximate distance to an object of the plurality of objects. The haptic feedback generator 222 may be configured to control the extending and the retracting of the plurality of protrusions by use of the plurality of haptic elements 218. The haptic feedback generator 222 may be configured to control grouping of the plurality of haptic elements 218 during extension to represent a particular shape for a protrusion. In accordance with an embodiment, the protrusion may be static or may be deformable. The same protrusion may have different meanings based on the deformation. For example, a 3D real-world area surrounding the user 110 may include a sportsman in a play ground. The sportsman while playing a soccer game may be standing on the playground or may be walking, and suddenly fell down. In such as a case, the protrusion (that may represent the sportsman) may be deformed to represent a sudden change for the same object in the 3D real-world area. The sudden change may be discernible by the user 110 in the generated touch-discernible feedback for the playground, based on the touch-discernible cue of the deforming protrusion. In some embodiments, the user 110 may be present on a river side and use the assistive device 102 to generate a touch-discernible feedback of the 3D real world area surrounding the user 110. A certain raised shape pattern generated on the haptic feedback interface 112 may represent water body (e.g. a river) ahead of the user 110. The raised shape pattern may be a constantly deforming protrusion. Based on a touch on the constantly deforming protrusion, the user 110 may discern not only a presence of a water-body, such as the river, based on a touch on the constantly deforming protrusion but also an exact location of the river, and the relative position of the user 110 from the water body in the generated touch-discernible feedback.

In accordance with an embodiment, the plurality of protrusions may be generated by application of different temperatures on different surface area of the haptic feedback interface 112. In such an embodiment, the haptic feedback interface 112 may include a covering on the upper surface (such as the upper surface 102a (FIG. 3A)). The covering may be a polymer-based layer sensitive to temperature. The plurality of the haptic elements 218 may be arranged as the array of cylindrical tubes below the covering. In cases where, a localized high temperature is generated through one or a group of the haptic elements of the plurality of haptic elements 218, a bulge may appear on the covering of the haptic feedback interface 112. Similarly, different bulge portions may represent the plurality of protrusions. Notwithstanding, the plurality of protrusions may be generated by various methods, such as by electro-chemical process, without limiting the scope of the disclosure. In accordance with an embodiment, the plurality of differential touch-discernible cues may be generated as different level of electric-pulses or a different amount of pressure, such as pain points (or pricking points) that may represent the positioning of the plurality of objects of the 3D real world area in the generated touch-discernible haptic feedback.

In accordance with an embodiment, the plurality of differential touch-discernible cues may be generated as multi-level pressure on the haptic feedback interface 112 by the haptic feedback generator 222. For example, a first object of the plurality of objects in the 3D real-world area may be discernible by generating a haptic signal through one or more haptic elements of the plurality of haptic elements 218 as a first amount of pressure. This first amount of pressure may be felt by the user 110 when the user 110 touches a specific portion, for example, a first portion, of the haptic feedback interface 112. Similarly, for each position of different objects of the plurality of objects, a different amount of pressure may be generated on the haptic feedback interface 112. Thus, the user 110 may feel different amount of pressure at different points (or portions) on the haptic feedback interface 112. The different amount of pressure enables the user 110 (by touch on the haptic feedback interface 112) to non-visually discern the relative positioning of the plurality of objects of the 3D real world area. The different amount of pressure in the generated touch-discernible haptic feedback corresponds to the plurality of differential touch-discernible cues generated as multi-level pressure.

In accordance with an embodiment, the plurality of differential touch-discernible cues may be generated as different temperatures, for example, different combination of hot and cold temperatures, on the haptic feedback interface 112 by the haptic feedback generator 222. For each position of different objects of the plurality of objects, a different temperature level may be generated on the haptic feedback interface 112 through one or more haptic elements of the plurality of haptic elements 218. The different level of temperature enables the user 110 (by touch on the haptic feedback interface 112) to non-visually discern the relative positioning of the plurality of objects including the user 110 in the 3D real world area.

In accordance with an embodiment, the plurality of differential touch-discernible cues may be generated as different level of electric-pulses on the haptic feedback interface 112 by the haptic feedback generator 222. For each position of different objects of the plurality of objects, a different level of electric-pulse may be generated on the haptic feedback interface 112 through a haptic element of the plurality of haptic elements 218. The different level of electric-pulses enables the user 110 (by touch on the haptic feedback interface 112) to non-visually discern the relative positioning of the plurality of objects of the 3D real world area. The different amount of electric-pulses in the generated touch-discernible haptic feedback corresponds to the plurality of differential touch-discernible cues generated as different level of electric-pulses. Further, when an object of the plurality of objects moves in the 3D real-world area, an electric-pulse (i.e. a touch-discernible cue) may also be felt on the haptic feedback interface 122 to be moving as a continuous line from one point of the haptic feedback interface 122 to another point to represent the movement and a direction of movement of the object of the plurality of objects in the 3D real-world area. The generation of electric-pulse (i.e. a touch-discernible cue) along a certain path on the haptic feedback interface 122 may be synchronized to the actual movement of the object in the 3D real-world area. This allows the user 110 to understand the path of movement of the object simply by placing one hand on a defined region of the haptic feedback interface 112, as shown in FIG. 3D. In case of the assistive device 102 is a wearable device, similar touch-discernible cues (e.g. different amount of pressure, different level of electric-pulses, different temperatures (such as hold and cold), different shape patterns, static or deformable protrusions, movement of touch-discernible cues), may be felt based on the contact of the skin of the user 110 with the haptic feedback interface 112 that may be wrapped on a body part, such as waist, or arm, as a wrap band, or worn as a pad. The movement of a touch-discernible cue, for example, a particular electric-pulse running from one point to another point of the haptic feedback interface 112, may further indicate a movement of an object of the plurality of objects in the 3D real-world area in the first proximity range of the user 110.

In accordance with an embodiment, the second circuitry 210 may be configured to control the output of the audio feedback via the one or more audio-output devices 224 as the user 110 moves from a first location to a second location in the 3D real-world area within the first proximity range. In accordance with an embodiment, the haptic feedback interface 112 may receive an input on the same surface of the haptic feedback interface 112 where the touch-discernible feedback is generated. For example, the user 110 may press a protrusion (or a bulge) generated on the haptic feedback interface 112. Based on the amount of pressure exerted by the user 110 while touching the protrusion on the haptic feedback interface 112, the press may be considered a haptic input by the haptic feedback controller 220. In cases where the amount of pressure exerted by the user 110 on a particular point or a protrusion on the haptic feedback interface 112 is greater than a threshold pressure value, the press of the protrusion (or a bulge) may be considered a haptic input for that particular object of the 3D real-world area that is indicated by the pressed protrusion. A corresponding action related to the pressed protrusion may be executed by the haptic feedback controller 220 in association with the second circuitry 210. For example, an oval shape protrusion, which denotes a particular object-type, for example, a car, may be pressed. An audio feedback for that car may be generated. For example, "this is a car at a distance of 3 meters from you, be careful". Such voice-based feedback provided in combination to the generated touch-discernible feedback provide a synergistic and enhanced non-visual navigation assistance to the user 110 in real time or near-real time as the user 110 moves in the 3D real-world area. For example, in this case the input detected on the oval shape protrusion for car is augmented with voice feedback that provides additional information for that particular car. Further, in conventional devices, the input section to receive a haptic input is different from the output section (in a conventional haptic user interface) where the Braille output or other tactile forms of output are generated. Typically, input section to receive haptic input is a 6-keys or 8-keys Braille input. A separate section to receive input and provide output, may be considered a rudimentary form of HMI, where a generated haptic output may not be capable of receive a further feedback on a particular touch-discernible cue. In contrast, the same tactile surface area of haptic feedback interface 112 of the assistive device 102 acts both as the haptic input receiver and haptic output generator, where the user 110 may press a protrusion (or a bulge) generated on the haptic feedback interface 112 to provide the haptic input related to a specific object in the vicinity of the assistive device 102. Based on the amount of pressure exerted by the user 110 while touching the protrusion on the haptic feedback interface 112, the press may be considered a haptic input by the haptic feedback controller 220.

In accordance with an embodiment, the haptic feedback generator 222 may be configured to update the mapping of the plurality of objects to the plurality of haptic elements 218 in the defined region of the haptic feedback interface 112. The update may be done based on a change in position of one or more movable objects of the plurality of objects including the user 110. The second circuitry 210 may be configured to detect the change in real time or near-real time from the received sensor data.

In accordance with an embodiment, the haptic feedback generator 222 may be configured to dynamically update the touch-discernible feedback on the haptic feedback interface 112 based on the update of the mapping, in conjunction with the second circuitry 210 and the haptic feedback controller 220. The updated touch-discernible feedback comprises a change in the relative positions of one or more of the plurality of objects with respect to the position of the user 110 of the assistive device 102.

Figure 3A:
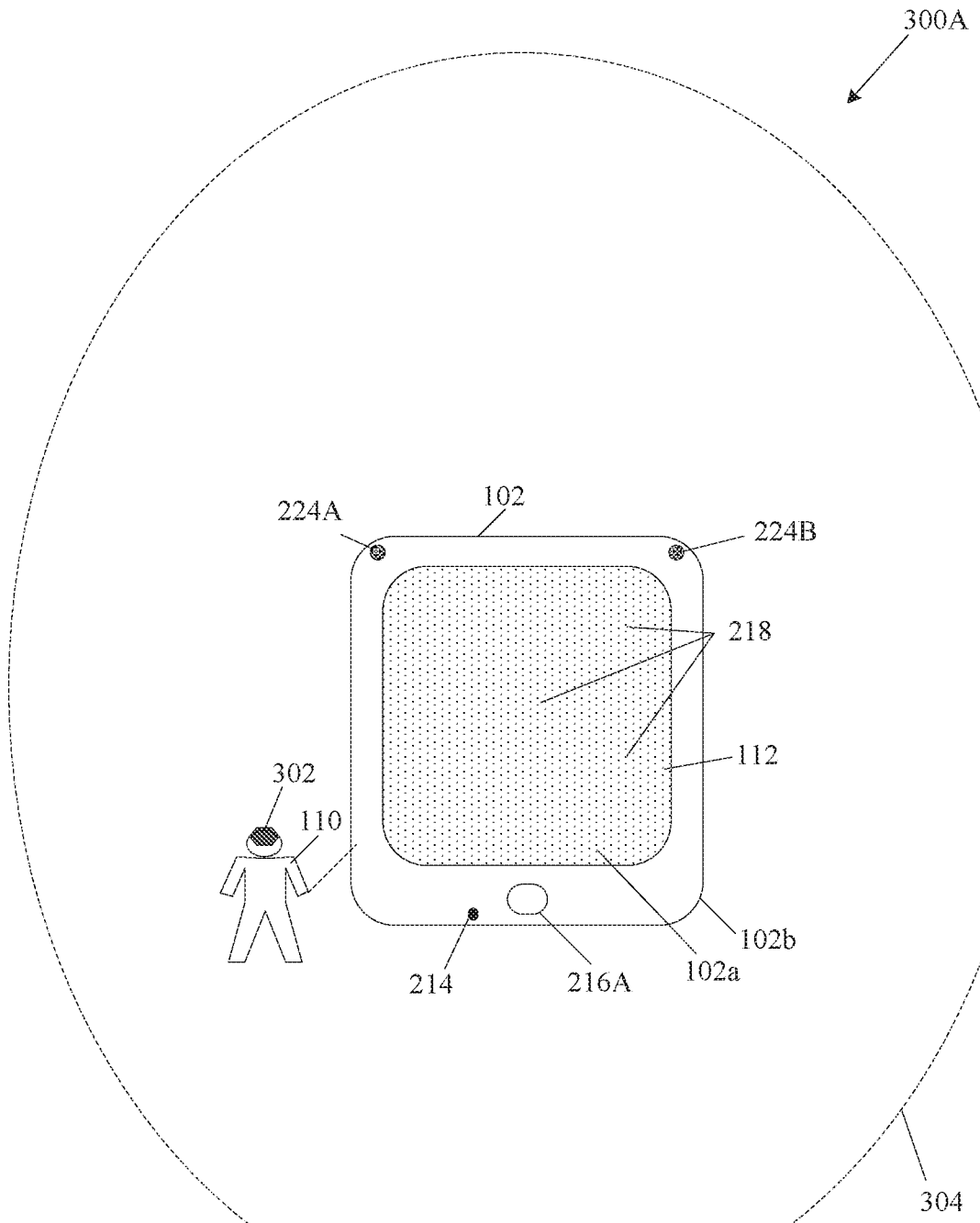
FIGS. 3A, 3B, 3C, and 3D illustrate exemplary scenario diagrams for implementation of the assistive device and method for non-visually discerning a 3D real-world area surrounding a user, in accordance with an embodiment of the disclosure.
Figure 3B:
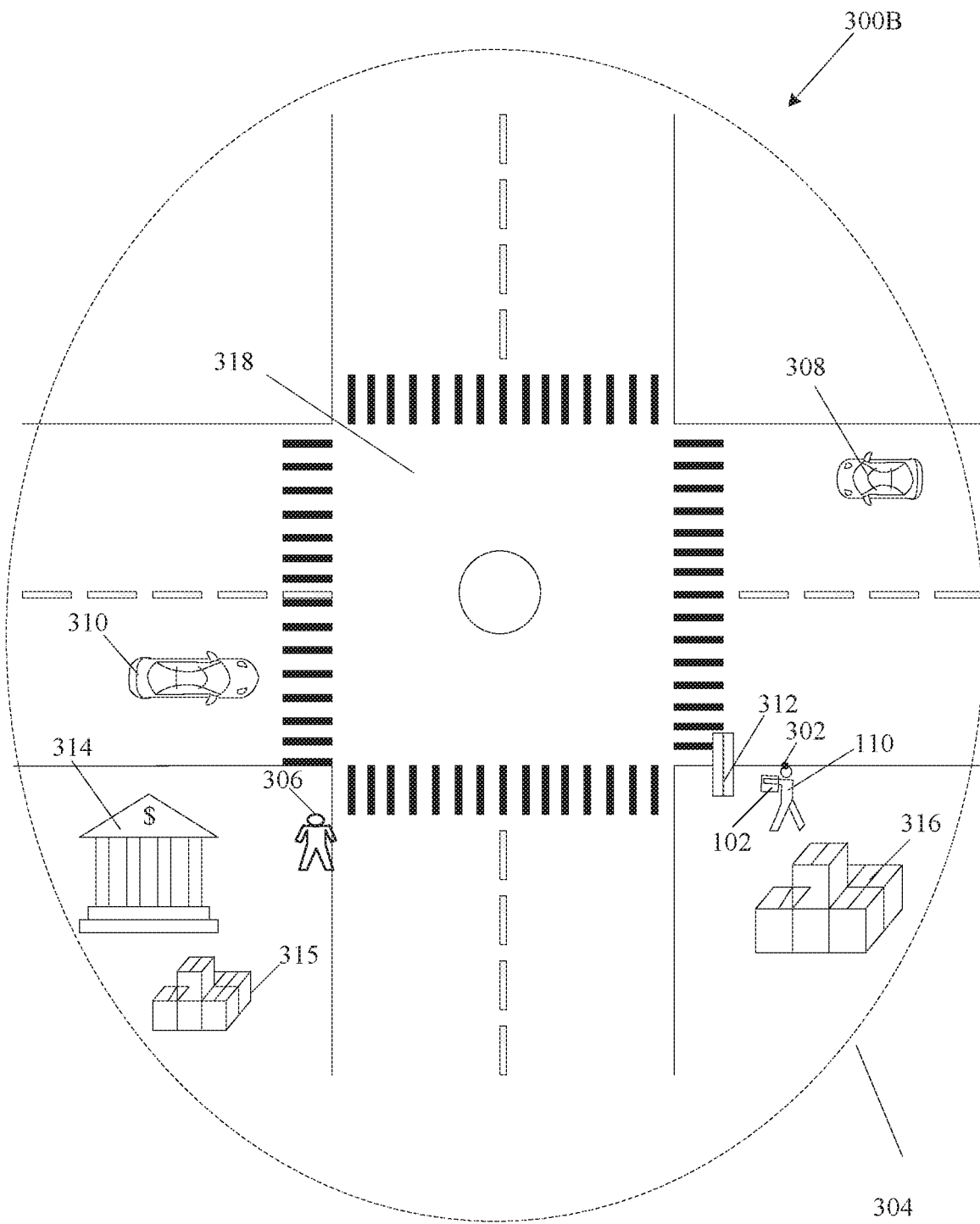
Figure 3C:
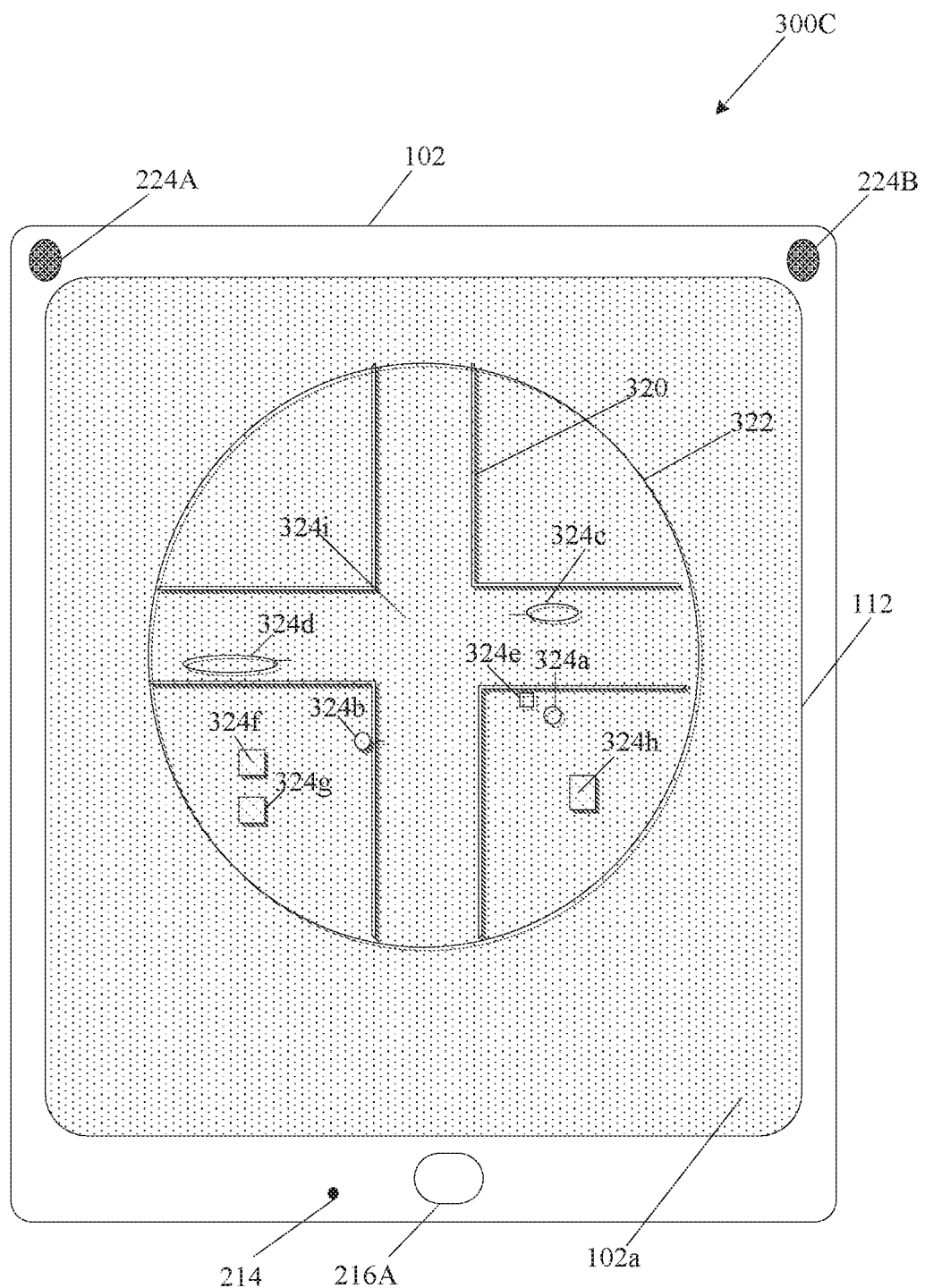
Figure 3D:
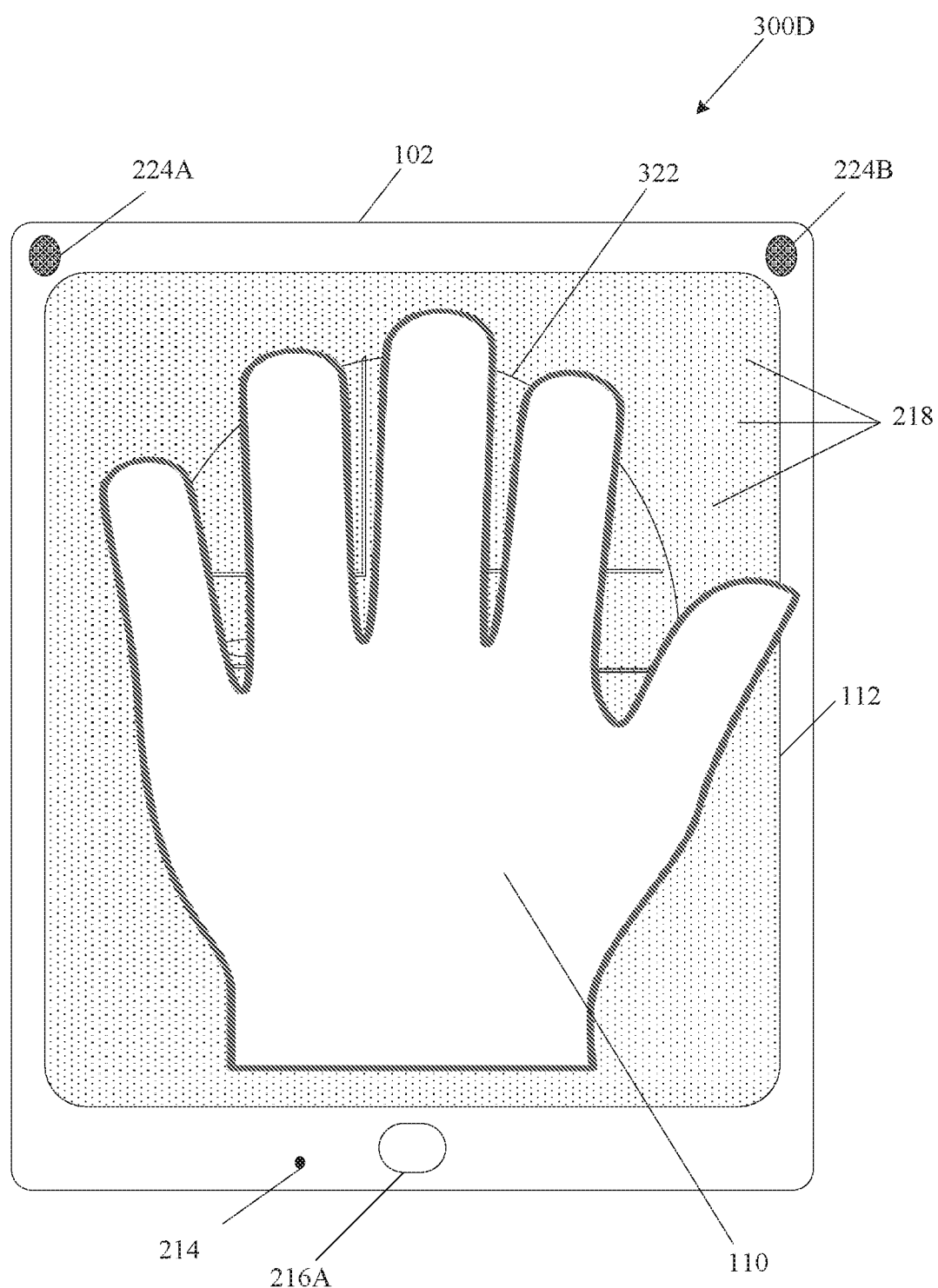

FIGS. 3A, 3B, 3C, and 3D illustrate exemplary scenario diagrams for implementation of the assistive device and method for non-visually discerning a 3D real-world area surrounding a user, in accordance with an embodiment of the disclosure. With reference to FIG. 3A, there is a shown a first exemplary scenario 300A, which is described in conjunction with elements from FIGS. 1 and 2. The first exemplary scenario 300A shows the user 110 with the assistive device 102 present in a 3D real-world area. There is also shown the microphone 214, the first audio-output device 224A, the second audio-output device 224B, and the plurality of haptic elements 218 of the haptic feedback interface 112. An image-capture device 302 may be placed worn by the user 110 of the assistive device 102, for example, as a headset. There is also shown a first proximity range 304 of the assistive device 102. The first proximity range 304 includes a certain portion (or sub-area) of the 3D real-world area surrounding the user 110 of the assistive device 102. There is also shown an upper surface 102a and a lower surface 102b of the assistive device 102.

In accordance to the first exemplary scenario 300A, the user 110 may be a person with loss of sight or impaired sight. The haptic feedback interface 112 is shown in a first state before the generation of any haptic touch-discernible feedback on the haptic feedback interface 112. The assistive device 102 may receive a voice input from the user 110 via the microphone 214. In accordance with an embodiment, the first audio-output device 224A and the second audio-output device 224B may output audio feedback to aid in voice-based navigation of the user 110 as the user 110 moves with the assistive device 102 from one location to another location in the 3D real-world area. In some embodiments, the lower surface 102b of the assistive device 102 may include a holding strap (not shown) in which one hand of the user 110 may be inserted so as to enable the user 110 to hold the assistive device 102 using the one hand while the other hand is free to be placed on the upper surface 102a of the assistive device 102 on the haptic feedback interface 112. In accordance with an embodiment, the assistive device 102 may include a plurality of hardware control buttons (not shown), such as a power button to ON/OFF the assistive device 102, a reset button to reset the generated touch-discernible feedback 320 (FIG. 3C) on the haptic feedback interface 112 to the first state, one or more volume control buttons/wheels to control audio output from the first audio-output device 224A and the second audio-output device 224B, a mute button to disable audio output, a proximity range setter to set a proximity range, and the like. The assistive device 102 may include various other components, as shown in FIG. 2, but for the sake of brevity are excluded from FIG. 3A.

With reference to FIG. 3B, there is shown a second exemplary scenario 300B that depicts the 3D-real world area surrounding the user 110 within the first proximity range 304 (of FIG. 3A) of the assistive device 102. FIG. 3B is explained in conjunction with elements from FIGS. 1, 2, and 3A. In the second exemplary scenario 300B, the 3D-real world area surrounding the user 110 within the first proximity range 304 includes a plurality of different objects. The plurality of different objects may include both moving objects (e.g. the user 110, another person 306, a first car 308, and a second car 310), and stationary objects (e.g. a pole 312, a plurality of buildings 314, 315, and 316, and a four-way street intersection 318). The 3D-real world area surrounding the user 110 within the first proximity range 304 may include many other objects, such as street lights, and the like, which are not shown for the sake of brevity.

In accordance with the second exemplary scenario 300B, the user 110 may be holding the assistive device 102. The user 110 may press a power "ON" button to initiate receipt of sensor data from the plurality of sensors 104. For example, the image-capture device 302 may be worn as a headset or placed at a suitable position on the body of the user 110 to capture a 360 view of the 3D real-world area that surrounds the user 110 within a first proximity range, for example, "X" meters, where "X" refers to a distance in natural numbers. In accordance with the second exemplary scenario 300B, the first proximity range may be set as 40 meters. The proximity range setter wheel provided in the assistive device 102 may be used to set the desired proximity range by the user 110. In some embodiments, the first proximity range may be a user-specified default range. In some embodiments, the first proximity range may correspond to an equal 'X' meters range from the center that corresponds to the position of the user 110. In some embodiments, the first proximity range may correspond to an unequal 'X' meters range from the position of the user 110, for example, more area may be covered in front, left, and right of the user 110 based on a direction of movement of the user 110 as compared to the rear area of the user 110.

In accordance with an embodiment, the first circuitry 208 may be configured to receive sensor data of the 3D real-world area within the first proximity range 304 of the assistive device 102. The sensor data may include the captured 360-degree view of the 3D real-world area that surrounds the user 110 within the first proximity range and RF sensor data that provide an estimation of distances and motion of each the plurality of different objects from the position of the user 110. The sensor data may also include sensed data from the IR sensor of the plurality of sensors 104. The sensed data from the IR sensor may be used to distinguish between living and non-living objects. The sensor data of the 3D real-world area within the first proximity range 304 may be received from the plurality of sensors 104. The plurality of sensors 104 may include wearable sensors that may be worn by the user 110, sensors that may be integrated with the assistive device 102, such as sensors of the sensor cluster unit 216, or sensors provided in other personal devices of the user 110. The sensor data of the 3D real-world area received in real time or near-real time may be used to collect information of the 3D real-world area within the first proximity range 304 of the user 110.

In accordance with an embodiment, the second circuitry 210 may be configured to generate a 3D digital model of the 3D real-world area, based on the received sensor data. The 3D digital model may correspond to a digital reproduction of the 3D real-world area within the first proximity range 304. The 3D digital model may include positional information of the plurality of different objects, such as the moving objects (e.g. the user 110, the person 306, the first car 308, and the second car 310), and stationary objects (e.g. the pole 312, the plurality of buildings 314, 315, and 316, and the streets of the four-way street intersection 318). The 3D digital model may include a relative position (or relative distances) of each of the plurality of different objects with respect to the position of the user 110 of the assistive device 102. The 3D digital model may include height information of each of the plurality of different objects with respect to the height of the user 110. The 3D digital model may also include an object-type identifier assigned to each object of the plurality of different objects. A same object-type identifier may be assigned to same or similar types of objects. For example, all human beings present in the first proximity range 304 may be assigned a same object-type identifier (e.g. first object-type identifier). Similarly, all vehicles present in the first proximity range 304 may be assigned a same object-type identifier but different from the object-type identifier assigned to the human beings (e.g. second object-type identifier). In accordance with an embodiment, the 3D digital model may also include size, and texture information of each of the plurality of different objects present in the first proximity range 304. As the 3D digital model includes information of the moving objects and the stationary objects, moving objects, for example moving cars may be identified/distinguished from stationary cars.

In accordance with an embodiment, the second circuitry 210 may be configured to compute a scaling factor based on the first proximity range 304 selected on the assistive device 102 and a defined region (such as the defined region 322 (FIG. 3C)) of the haptic feedback interface 112 on which a haptic feedback is to be mapped. The scaling factor denotes how much reduction in size, and relative adjustment of the size, shape, height, and position of the plurality of different objects may be required to be able to map the plurality of different objects to the plurality of haptic elements 218 in the defined region of the haptic feedback interface 112. In accordance with an embodiment, the second circuitry 210 may be configured to establish the mapping of the plurality of different objects to the plurality of haptic elements 218 in the defined region of the haptic feedback interface 112, based on the received sensor data and the generated 3D digital model.

With reference to FIG. 3C, there is shown a third exemplary scenario 300C that depicts a touch-discernible feedback 320 generated on a defined region 322 of the haptic feedback interface 112. FIG. 3C is explained in conjunction with elements from FIGS. 1, 2, 3A, and 3B. The touch-discernible feedback 320 includes a plurality of differential touch-discernible cues 324a, 324b, 324c, 324d, 324e, 324f, 324g, 324h, and 324i. The plurality of differential touch-discernible cues 322a to 322i represents the plurality of different objects in the 3D real-world area within the first proximity range 304 of the assistive device 102.

In accordance with an embodiment, the haptic feedback generator 222 may be configured to generate the touch-discernible feedback 320 on the haptic feedback interface 112 based on the established mapping. The touch-discernible feedback 320 may comprise a plurality of differential touch-discernible cues 324a to 324i to discern a 3D arrangement of each of the plurality of different objects with respect to a position of the user 110 of the assistive device 102. For example, the plurality of differential touch-discernible cues 324a to 324i may be generated as the plurality of protrusions of different shapes that are extended from the surface of the haptic feedback interface 112. One shape may be assigned to one identified object-type of the plurality of objects of the 3D real-world area within the first proximity range to enable the user 110 to discern the object-type when the user 110 touches a protrusion of a defined shape. For example, the touch-discernible cue 324a may be a round protrusion that indicates the position of the user 110 in the 3D real-world area. The touch-discernible cue 324b may be a round protrusion that indicates the object-type as human being and the position of the person 306 (FIG. 3B) in the 3D real-world area. The touch-discernible cue 324c and 324d may be oval protrusions that indicate the object-type as car and the positions of the first car 308 and the second car 310 respectively. The touch-discernible cue 324c and 324d also indicates the direction of travel discernible by touch. The touch-discernible cue 324e may be a spike-shaped protrusion that indicates the object-type as pole and the position of the pole 312 in the 3D real-world area. Similarly, the touch-discernible cues 324f, 324g, and 324h may be square-shaped protrusions that indicate the object-type as buildings and the positions of the buildings 314, 315, and 316 respectively. Lastly, the touch-discernible cue 324i may be a first set of raised parallel lines and a second set of raised parallel lines crossing each other at the centre that indicate the object-type as "streets intersection" and the positions and layout of the streets of the four-way street intersection 318 (FIG. 3B). Thus, similar to the sighted people who use information about the features on the surface of an object, like color, shading, or overall size, and shape, to recognize an object, the people who have lost the sense of sight may also identify an object-type and object position based on a touch on the protrusion of a defined shape in the generated touch-discernible feedback 320, where an association of a particular shape with a particular object-type is learned by the brain. The user 110 may discern the 3D real-world area surrounding the user 110 within the first proximity range 304 based on the generated touch-discernible haptic feedback 320.

In accordance with an embodiment, the second circuitry 210 may be configured to control the output of an audio feedback via the one or more audio-output devices 224 as the user 110 moves in the 3D real-world area within the first proximity range 304. For example, based on the current position of the user 110 (indicated by the touch-discernible cue 324a), an audio feedback may be generated as "There is a pole nearby 4 feet on your right that have a push-to-walk button. Please locate and press the push-to-walk button on the pole 312 to activate the pedestrian walking signal to safely cross the road". Further, the audio feedback via the one or more audio-output devices 224 may provide navigational assistance, for example, turn left, turn right, cross the street, stop here, start moving, and the like, in combination with the generated touch-discernible feedback 320. Such voice-based feedback provided in combination to the generated touch-discernible feedback 320 provide a synergistic and enhanced non-visual navigation assistance to the user 110 in real time or near-real time as the user 110 moves in the 3D real-world area. In some embodiments, the voice-based feedback may be customized output for the user 110, for example, the user 110 may want to reach to the destination, for example, a bank (i.e. the building 314 (FIG. 3B)) from the current location near the pole 312. Thus, customized voice feedbacks may be generated in sequence to provide non-visual navigation assistance to the user 110, for example, turn right and move 4 steps, then turn left and move 5 steps, press the push-to-walk button on the pole 312 on your right, wait for 60 seconds for the pedestrian walk signal, walk signal is now activated, start moving ahead for 30 steps, turn left and move ahead for 10 steps, the bank is on your right. Turn right and move 5 steps to enter the building 314. Thus, based on the learning engine and usage history, the second circuitry 210 may be configured to convert the distance to user steps to enable the user 110 to readily and easily understand the instructions in the customized audio feedback in combination with the generated touch discernible feedback 320.

With reference to FIG. 3D, there is shown a fourth exemplary scenario 300D that depicts an exemplary placement of a hand of the user 110 on a defined region 322 of the haptic feedback interface 112 for non-visually discerning the 3D real-world area surrounding the user 110 within the first proximity range 304. It is known that the sense of touch has a much greater sensory resolution than the sense of sight. Hence, the sense of touch can detect even small changes on a surface of the haptic feedback interface 112. The user 110 may non-visually discern the 3D real-world area surrounding the user 110 within the first proximity range 304 by tactioception based on a user touch on the touch-discernible feedback 320 in the defined region 322 of the haptic feedback interface 112. The haptic feedback generator 222 may be configured to dynamically update the touch-discernible feedback 320 and the positions of the one or more touch-discernible cues on the haptic feedback interface 112. The update may be done based on a change in position of one or more movable objects, such as the first car 308, the second car 310, the person 306, and the user 110. The second circuitry 210 may be configured to detect the change in real time or near-real time from the received sensor data and signal the changes to the haptic feedback generator 222 to update the touch-discernible feedback 320.

In some embodiments, the assistive device 102 may be implemented as a hand-held portable device. In some embodiments, the assistive device 102 may be implemented as one or more wearable devices that may be worn around at different parts of the human body having sensory receptors that senses touch. In such embodiments, the haptic feedback interface 112 may be a foldable or bendable layer of pad or wrap band that may be worn on different parts of the body a user, such as the user 110. The assistive device 102 may also include pads, bands, or straps, to enable the assistive device 102 to be worn at different parts of the body of the user 110. For example, the assistive device 102 may be implemented as specialized hand gloves, where multiple haptic feedback interfaces (similar to the haptic feedback interface 112) may be in contact with skin of both the upper side and lower side (i.e. palm) of one or both hands of the user 110 to convey information of the 3D real-world area in the form of the touch-discernible haptic feedback generated by the haptic feedback generator 222.

In one example, the assistive device 102 with the haptic feedback interface 112 may be worn as a shoe sole that provides touch-discernible haptic feedback. In some embodiments, multiple assistive devices with the haptic feedback interface 112 may be worn, for example, one as a shoe sole and other as a hand-held device. In another example, the assistive device 102 with the haptic feedback interface 112 may be wrapped around one or both forearms of a human body, such as the user 110. Thus, similar to the hand-held device, when the assistive device 102 is worn, the skin of the user 110 (e.g. sensory receptors at skin of the forearms, thigh, waist, leg, feet, and the like) may feel the plurality of differential touch-discernible cues 324a to 324i in the touch-discernible feedback 320 without a touch by a hand or finger(s) of hand for non-visually discerning the 3D real-world area surrounding the user 110 within the first proximity range 304. In FIGS. 3C and 3D, the plurality of differential touch-discernible cues, for example, are shown to be generated as a plurality of different protrusions of different shapes. However, the plurality of differential touch-discernible cues may also be generated as different level of electric-pulses, different amount of pressure or pain, different level of temperature, or their combination, on the haptic feedback interface 112 by the haptic feedback generator 222, as described in FIG. 2.

In accordance with an embodiment, the assistive device 102 may include a view-change button. The view-change button may be used by the user 110 to change the capture of sensor data for a front area of the 3D-real world area instead of all the area within the first proximity range 304. Thereby, the touch-discernible feedback may be generated for the front area of the 3D-real world area (i.e. a front view from the perspective of user 110). Similarly, a second press on the view-change button may result in the generation of the touch-discernible feedback for rear view, for example, to view an area behind the user 110. In some embodiments, the haptic feedback interface 112 may comprise a plurality of defined regions, for example, two defined regions. A first defined region of the plurality of defined regions may be configured to generate a first touch-discernible feedback for the front view, whereas a second defined region of the plurality of defined regions may be configured to generate a second first touch-discernible feedback for the rear view from the perspective of the user 110. In some embodiments, the modality of generation of the plurality of differential touch-discernible cues for the first touch-discernible feedback may be same as the second first touch-discernible feedback. In some embodiments, the modality of generation of the plurality of differential touch-discernible cues for the first touch-discernible feedback may be different from the second first touch-discernible feedback. The modality of generation of the plurality of differential touch-discernible cues corresponds to generation of the plurality of differential touch-discernible cues as different protrusions of different shapes, different level of electric-pulses, different amount of pressure or pain, different level of temperature, or their combination, on the haptic feedback interface 112.

Figure 4B:
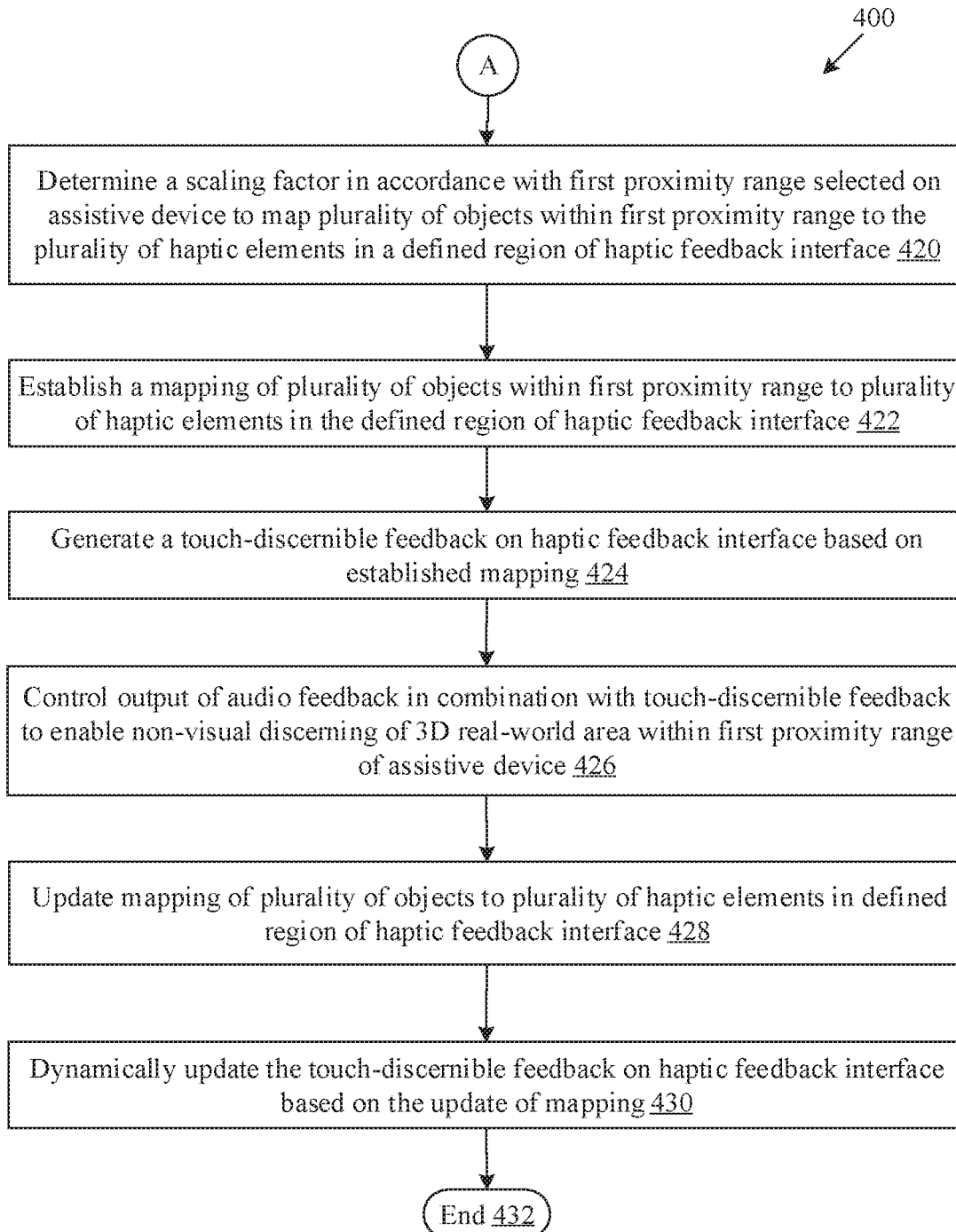

FIGS. 4A and 4B, collectively, depict a flow chart 400 that illustrates a method for non-visually discerning a 3D real-world area surrounding a user, in accordance with an embodiment of the disclosure. FIGS. 4A and 4B are described in conjunction with elements from the FIGS. 1, 2, and 3A to 3D. As shown in FIG. 4A, the method of the flow chart 400 starts at 402 and proceeds to 404.

At 404, a current location of the assistive device 102 may be detected. The second circuitry 210 may be configured to detect the current location of the assistive device 102 using the location sensor. The location sensor may be provided in the sensor cluster unit 216 of the assistive device 102 or may refer to one of the plurality of sensors 104. At 406, it may be checked whether a first template map of a 3D real-world area for the detected current location of the assistive device 102 is available. The availability of the first template map of a 3D real-world area may be checked at the server 106 or the memory 212. In cases where the first template map is available, the control passes to 408, else to 410.

At 408, a first template map of a 3D real-world area within a first proximity range of the assistive device 102 may be acquired. The first circuitry 208 may be configured to acquire the first template map of the 3D real-world area within the first proximity range (e.g. the first proximity range 304) of the assistive device 102. In accordance with an embodiment, the first template map may be acquired from the server 106 based on the current location of the assistive device 102. As the user 110 may be equipped with the assistive device 102, the location of the assistive device 102 may be same as that of the user 110. In some embodiments, the memory 212 may store 2D/3D maps of geographical regions of the earth surface, such as street views.

At 410, sensor data of the 3D real-world area within the first proximity range of the assistive device 102 may be received. The first circuitry 208 may be configured to receive sensor data of the 3D real-world area within the first proximity range (e.g. the first proximity range 304) of the assistive device 102 from the plurality of sensors 104 that are communicatively coupled to the assistive device 102. In some embodiments, the sensor data may also be received from the sensor cluster unit 216. In some embodiments, the first template map of a 3D real-world area may not be acquired, for example, in case of indoor locations or for regions where the first template map may not be available. In such a case, the sensor data of the 3D real-world area received in real time or near-real time may be used to collect information of the 3D real-world area within the first proximity range of the assistive device 102.

At 412, an object-type of each of the plurality of objects present within the first proximity range of the assistive device 102 may be identified, based on the received sensor data. The second circuitry 210 may be further configured to identify the object-type of each of the plurality of different objects present within the first proximity range of the assistive device 102 based on the received sensor data.

At 414, a relative position and a height of each of the plurality of objects with respect to the position of the user 110 of the assistive device 102 may be determined. The second circuitry 210 may be configured to determine the relative position of each of the plurality of objects with respect to the position of the user 110 of the assistive device 102. The relative position of each of the plurality of objects may be determined based on the sensor data received in real time or near-real time from the plurality of sensors 104 worn by the user 110.

At 416, the first template map with at least positional information of the plurality of objects may be updated, based on the received sensor data of the 3D real-world area within the first proximity range of the assistive device 102. The second circuitry 210 may be configured to update the first template map in real time or near-real time based on the sensor data of the 3D real-world area.

At 418, a 3D digital model of the 3D real-world area within the first proximity range may be generated. The second circuitry 210 may be configured to generate the 3D digital model of the 3D real-world area, based on the received sensor data.

At 420, a scaling factor may be determined in accordance with the first proximity range selected on the assistive device to map the plurality of objects within the first proximity range to the plurality of haptic elements in a defined region of the haptic feedback interface 112. The second circuitry 210 may be configured to compute the scaling factor in accordance with the first proximity range and the area of the defined region of the haptic feedback interface 112.

At 422, a mapping of a plurality of objects within the first proximity range to the plurality of haptic elements 218 in the defined region of the haptic feedback interface 112, may be established. The second circuitry 210 may be configured to establish the mapping of the plurality of objects to the plurality of haptic elements 218 in the defined region of the haptic feedback interface 112, based on the received sensor data. In accordance with an embodiment, the generated 3D digital model may be utilized for the mapping of the plurality of objects within the first proximity range to the plurality of haptic elements 218.

At 424, a touch-discernible feedback may be generated on the haptic feedback interface 112 based on the established mapping. The haptic feedback generator 222 may be configured to generate the touch-discernible feedback on the haptic feedback interface 112 based on the established mapping. The touch-discernible feedback may comprise a plurality of differential touch-discernible cues to discern a relative position of each of the plurality of objects with respect to a position of the user 110 of the assistive device 102. The haptic feedback generator 222 also generates the plurality of differential touch-discernible cues to discern different identified object-types of the plurality of objects present within the first proximity range of the assistive device 102.

At 426, an output of an audio feedback may be controlled in combination with the touch-discernible feedback to enable non-visually discerning of the 3D real-world area within the first proximity range of the assistive device 102 by the user 110. The second circuitry 210 may be configured to control the output of the audio feedback via the one or more audio-output devices 224 as the user 110 moves from a first location to a second location in the 3D real-world area within the first proximity range.

At 428, the mapping of the plurality of objects to the plurality of haptic elements in the defined region of the haptic feedback interface may be updated. The haptic feedback generator 222 may be configured to update the mapping of the plurality of objects to the plurality of haptic elements 218 in the defined region of the haptic feedback interface 112. The update may be done based on a change in position of one or more movable objects of the plurality of objects including the user 110. The second circuitry 210 may be configured to detect the change in real time or near-real time from the received sensor data.

At 430, the touch-discernible feedback may be dynamically updated on the haptic feedback interface 112 based on the update of the mapping. The haptic feedback generator 222 may be configured to dynamically update the touch-discernible feedback on the haptic feedback interface 112 based on the update of the mapping, in conjunction with the second circuitry 210 and the haptic feedback controller 220. The updated touch-discernible feedback comprises a change in the relative positions of one or more of the plurality of objects with respect to the position of the user 110 of the assistive device 102. Control passes to end 432.

In accordance with an exemplary aspect of the disclosure, a system for non-visually discerning a three-dimensional (3D) real-world area surrounding a user, such as the user 110 is disclosed. The system may include the assistive device 102 (FIG. 1), which may comprise the haptic feedback interface 112 (FIG. 1) comprising the plurality of haptic elements 218 (FIG. 2). The assistive device 102 may further comprise the first circuitry 208, the second circuitry 210, and the haptic feedback generator 222 (FIG. 2). The first circuitry 208 may be configured to receive sensor data of a 3D real-world area within a first proximity range of the assistive device 102 from the plurality of sensors 104 that are communicatively coupled to the assistive device 102. The second circuitry 210 may be configured to establish a mapping of a plurality of objects within the first proximity range to the plurality of haptic elements 218 in a defined region (e.g. the defined region 322) of the haptic feedback interface 112, based on the received sensor data. The haptic feedback generator 222 may be configured to generate a touch-discernible feedback (e.g. the touch-discernible feedback 320) on the haptic feedback interface 112 based on the established mapping. The touch-discernible feedback may comprise a plurality of differential touch-discernible cues to discern a relative position of each of the plurality of objects with respect to a position of the user 110 of the assistive device 102.

The present disclosure may be realized in hardware, or a combination of hardware and software. The present disclosure may be realized in a centralized fashion, in at least one computer system, or in a distributed fashion, where different elements may be spread across several interconnected computer systems or the special-purpose device. A computer system or other special-purpose apparatus adapted to carry out the methods described herein may be suited. The present disclosure may be realized in hardware that comprises a portion of an integrated circuit that also performs other functions.

The present disclosure may also be embedded in a computer program product, which comprises all the features that enable the implementation of the methods described herein, and which, when loaded in a special-purpose machine or computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. An assistive device, comprising:
a haptic feedback interface comprising a plurality of haptic elements and a plurality of defined regions;
a first circuitry configured to:
  receive sensor data of a three-dimensional (3D) real-world area from a plurality of different types of sensors that are communicatively coupled to the assistive device,
    wherein the sensor data is associated with a first proximity range of the assistive device, and
    wherein the first proximity range corresponds to a template map of the 3D real-world area;
  acquire weather conditions from one or more group of sensors from the plurality of different types of sensors;

assign a weigh value to each group of sensors of the one or more group of sensors based on accuracy of the sensor data detected in the acquired weather conditions;

process first sensor data received from a first group of sensors of the plurality of different types of sensors and second sensor data received from a second group of sensors of the plurality of different types of sensors based on the weigh value assigned to each of the first group of sensors and the second group of sensors, wherein in one or more of the weather conditions when the first sensor data is below a threshold value, a higher weigh value is assigned to the second sensor data as compared to the first sensor data;

a second circuitry configured to:
establish a mapping of a plurality of objects within the first proximity range to at least one haptic element of the plurality of haptic elements in each of the plurality of defined regions of the haptic feedback interface, wherein the mapping of the plurality of objects within the first proximity range is established based on the processing of the first sensor data received from the first group of sensors and the second sensor data received from the second group of sensors; and adjust sizes of the plurality of objects to map the plurality of objects to the at least one haptic element in a corresponding defined region of the plurality of defined regions, wherein the sizes of the plurality of objects are adjusted based on a scaling factor determined based on a surface area of the corresponding defined region; and a haptic feedback generator configured to generate a touch-discernible feedback on the haptic feedback interface for each of the plurality of defined regions based on the established mapping, wherein the haptic feedback generator is further configured to generate a first touch-discernible feedback on a first defined region of the haptic feedback interface, wherein the first defined region corresponds to a front view from a perspective of a user, wherein the haptic feedback generator further configured to generate a second touch-discernible feedback on a second defined region of the haptic feedback interface, wherein the second defined region corresponds to a rear view from the perspective of the user, wherein each of the first touch-discernible feedback and the second touch-discernible feedback comprises at least one touch-discernible cue to discern a 3D arrangement of each object of the plurality of objects with respect to a position of the user of the assistive device, and wherein the at least one touch-discernible cue for the 3D arrangement of each object of the plurality of objects comprises at least one protrusion that extends from a surface of the haptic feedback interface.

2. The assistive device according to claim 1, wherein the second circuitry is further configured to identify an object-type of each object of the plurality of objects within the first proximity range of the assistive device, and
wherein the object-type of each object is identified based on the sensor data.

3. The assistive device according to claim 2, wherein the haptic feedback generator is further configured to generate the at least one touch-discernible cue to discern the object-type of each object of the plurality of objects within the first proximity range of the assistive device.

4. The assistive device according to claim 3,
wherein the second circuitry is further configured to determine at least one of a relative position or a height of each object of the plurality of objects with respect to the position of the user of the assistive device for the 3D arrangement, and
wherein the at least one of the relative position or the height of each object is determined based on the sensor data received in real time or near-real time from the plurality of different types of sensors.

5. The assistive device according to claim 3, wherein the second circuitry is further configured to generate a 3D digital model of the 3D real-world area within the first proximity range,
wherein the 3D digital model is generated based on the sensor data, and
wherein the 3D digital model is for the mapping of the plurality of objects within the first proximity range to the at least one haptic element of the plurality of haptic elements.

6. The assistive device according to claim 3, wherein the second circuitry is further configured to:
acquire the template map of the 3D real-world area within the first proximity range of the assistive device from a server, wherein the template map is acquired based on the position of the user; and
update the template map with at least positional information of the plurality of objects based on the sensor data of the 3D real-world area within the first proximity range of the assistive device,
wherein the at least positional information of the plurality of objects is received from the plurality of different types of sensors in real time or near-real time.

7. The assistive device according to claim 1, wherein the first proximity range is selected on the assistive device.

8. The assistive device according to claim 1, wherein the second circuitry is further configured to update the mapping of the plurality of objects within the first proximity range to the at least one haptic element of the plurality of haptic elements in each of the plurality of defined regions of the haptic feedback interface,
wherein the mapping is updated based on a change in position of at least one movable object of the plurality of objects or the user, and
wherein the change in the position is detected in real time or near-real time from the sensor data.

9. The assistive device according to claim 8, wherein the haptic feedback generator is further configured to update the touch-discernible feedback on the haptic feedback interface based on the update of the mapping, and
wherein the updated touch-discernible feedback comprises a change in a relative position of at least one object of the plurality of objects with respect to the position of the user of the assistive device.

10. The assistive device according to claim 1, wherein the haptic feedback generator is further configured to output an audio feedback in combination with the touch-discernible feedback to enable non-visual discernment of the 3D real-world area within the first proximity range of the assistive device by the user as the user moves from a first location to a second location in the 3D real-world area within the first proximity range.

11. The assistive device according to claim 1, further comprises a learning engine in a memory of the assistive device, wherein the second circuitry is further configured to determine at least one pattern in a plurality of user interactions on the haptic feedback interface over a period of time, and wherein the at least one pattern is determined based on a tracking of a usage pattern of the assistive device by the learning engine.

12. The assistive device according to claim 11, wherein the second circuitry is further configured to adapt the mapping of the plurality of objects within the first proximity range to the at least one haptic element of the plurality of haptic elements in each of the plurality of defined regions of the haptic feedback interface based on the determined at least one pattern.

13. The assistive device according to claim 1, wherein the haptic feedback interface is a haptic input/output interface.

14. The assistive device according to claim 13 further comprising a haptic feedback controller, wherein the haptic feedback controller is configured to detect a haptic input on the haptic feedback interface, and wherein the haptic input is detected based on a press on the at least one touch-discernible cue generated in the touch-discernible haptic feedback.

15. The assistive device according to claim 1, further comprising a view-change button configured to switch between the generation of the first touch-discernible feedback for the front view from the user's perspective and the generation of the second touch-discernible feedback for the rear view from the user's perspective.

16. A method, comprising:

in an assistive device that comprises a first circuitry, a second circuitry, a haptic feedback generator, and a haptic feedback interface that includes a plurality of haptic elements and a plurality of defined regions:

receiving, by the first circuitry, sensor data of a three-dimensional (3D) real-world area from a plurality of different types of sensors that are communicatively coupled to the assistive device, wherein the sensor data is associated with a first proximity range of the assistive device, and wherein the first proximity range corresponds to a template map of the 3D real-world area;

acquiring weather conditions from one or more group of sensors from the plurality of different types of sensors;

assigning a weigh value to each group of sensors of the one or more group of sensors based on accuracy of the sensor data detected in the acquired weather conditions, wherein in one or more of the weather conditions when the first sensor data is below a threshold value, a higher weigh value is assigned to the second sensor data a s compared to the first sensor data;

processing first sensor data received from a first group of sensors of the plurality of different types of sensors and second sensor data received from a second group of sensors of the plurality of different types of sensors based on the weigh value assigned to each of the first group of sensors and the second group of sensors;

establishing, by the second circuitry, a mapping of a plurality of objects within the first proximity range to at least one haptic element of the plurality of haptic elements in each of the plurality of defined regions of the haptic feedback interface, wherein the mapping of the plurality of objects within the first proximity range is established based on the processing of the first sensor data received from the first group of sensors and the second sensor data received from the second group of sensors;

adjusting sizes of the plurality of objects to map the plurality of objects to the at least one haptic element in a corresponding defined region of the plurality of defined regions, wherein the sizes of the plurality of objects are adjusted based on a scaling factor determined based on a surface area of the corresponding defined region; and generating, by the haptic feedback generator, a touch-discernible feedback on the haptic feedback interface for each of the plurality of defined regions based on the established mapping, wherein a first touch-discernible feedback is generated on a first defined region of the haptic feedback interface, wherein the first defined region corresponds to a front view from a perspective of a user, wherein a second touch-discernible feedback is generated on a second defined region of the haptic feedback interface, wherein the second defined region corresponds to a rear view from the perspective of the user, wherein each of the first touch-discernible feedback and the second touch-discernible feedback comprises at least one touch-discernible cue to discern a 3D arrangement of each object of the plurality of objects with respect to a position of the user of the assistive device, and wherein the at least one touch-discernible cue for the 3D arrangement of each object of the plurality of objects comprises at least one protrusion that extends from a surface of the haptic feedback interface.

17. The method according to claim 16, further comprising identifying, by the second circuitry, an object-type of each object of the plurality of objects within the first proximity range of the assistive device, wherein the object-type of each object is identified based on at least one of the first sensor data or the second sensor data.

18. The method according to claim 17, further comprising generating, by the haptic feedback generator, the at least one touch-discernible cue to discern the object-type of each object of the plurality of objects within the first proximity range of the assistive device.

19. The method according to claim 16, further comprising determining, by the second circuitry, at least one of a relative position or a height of each object of the plurality of objects with respect to the position of the user of the assistive device for the 3D arrangement, wherein the at least one of the relative position or the height of each object is determined based on the sensor data received in real time or near-real time from the plurality of different types of sensors.

20. The method according to claim 16, further comprising generating, by the second circuitry, a 3D digital model of the 3D real-world area within the first proximity range, wherein the 3D digital model is generated based on the sensor data, and wherein the 3D digital model is for the mapping of the plurality of objects within the first proximity range to the at least one haptic element of the plurality of haptic elements.

21. An assistive device, comprising:

a haptic feedback interface comprising a plurality of haptic elements;

a first circuitry configured to:
  receive sensor data of a three-dimensional (3D) real-world area from a plurality of different types of sensors that are communicatively coupled to the assistive device,
  wherein the sensor data is associated with a first proximity range of the assistive device, and
  wherein the first proximity range corresponds to a template map of the 3D real-world area;
  acquire weather conditions from one or more group of sensors from the plurality of different types of sensors;
  assign a weigh value to each group of sensors of the one or more group of sensors based on accuracy of the sensor data detected in the acquired weather conditions, wherein in one or more of the weather conditions when the first sensor data is below a threshold value, a higher weigh value is assigned to the second sensor data as compared to the first sensor data;
  process first sensor data received from a first group of sensors of the plurality of different types of sensors and second sensor data received from a second group of sensors of the plurality of different types of sensors based on the weigh value assigned to each of the first group of sensors and the second group of sensors;
a second circuitry configured to:
  establish a mapping of a plurality of objects within the first proximity range to at least one haptic element of the plurality of haptic elements in a defined region of the haptic feedback interface, wherein the mapping of the plurality of objects within the first proximity range is established based on the processing of the first sensor data received from the first group of sensors and the second sensor data received from the second group of sensors; and
  adjust sizes of the plurality of objects to map the plurality of objects to the at least one haptic element in a corresponding defined region of the plurality of defined regions, wherein the sizes of the plurality of objects are adjusted based on a scaling factor determined based on a surface area of the corresponding defined region; and
a haptic feedback generator configured to generate a touch-discernible feedback on the haptic feedback interface based on the established mapping,
wherein the touch-discernible feedback comprises a plurality of touch-discernible cues to discern a 3D arrangement of each object of the plurality of objects with respect to a position of a user of the assistive device, and
wherein the touch-discernible feedback corresponds to a differential temperature-based touch-discernible feedback.

* * * * *